(12) United States Patent
Takaishi

(10) Patent No.: US 7,397,628 B2
(45) Date of Patent: Jul. 8, 2008

(54) TWO DEGREE OF FREEDOM POSITION CONTROL METHOD, TWO DEGREE OF FREEDOM POSITION CONTROL DEVICE, AND MEDIUM STORAGE DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/732,182

(22) Filed: Apr. 3, 2007

(65) Prior Publication Data

US 2008/0074780 A1    Mar. 27, 2008

(30) Foreign Application Priority Data

Sep. 22, 2006    (JP) .............................. 2006-256604

(51) Int. Cl.
*G11B 5/596*    (2006.01)
(52) U.S. Cl. ................................ 360/77.06; 360/77.07
(58) Field of Classification Search .................. None
See application file for complete search history.

(56) References Cited

U.S. PATENT DOCUMENTS 6,166,876 A *   12/2000   Liu .......................... 360/78.04
6,411,461 B1 *  6/2002    Szita ....................... 360/77.07
2001/0003497 A1 * 6/2001  Takaishi .................. 360/77.04
2006/0007592 A1 * 1/2006  Takaishi et al. ......... 360/78.06
2006/0291101 A1 * 12/2006 Takaishi .................... 360/244
2008/0024906 A1 * 1/2008  Takaishi .................. 360/78.06

FOREIGN PATENT DOCUMENTS

JP    2000-048502    2/2000

OTHER PUBLICATIONS

Takeyori Hara; "Performance Enhancement of Multi-rate Controller for Hard Disk Drives"; IEEE Trans. on Magnetics, vol. 35, No. 2; Mar. 1999; pp. 898-903.

* cited by examiner

*Primary Examiner*—Jason C Olson
(74) *Attorney, Agent, or Firm*—Greer, Burns & Crain, Ltd.

(57) ABSTRACT

In a position control device based on a current observer control for performing two degree of freedom control, deterioration of the position accuracy caused by the output delay due to computation is prevented. In the two degree of freedom control system for preventing overrun, the delay of output of the two degree of freedom control (computing delay and hardware delay of drive amplifier, D/A converter, etc.) is considered, and the estimated state of Td which is advanced by the amount of delay from the sample point of time is computed, then output is computed based on this estimated state. So even if state changes during calculation from the sample point of time, the influence of the output delay can be prevented, and highly accurate position control can be performed, therefore overrun can be prevented.

18 Claims, 10 Drawing Sheets

Servo Mark
Gray Code
Index
PosA PosB PosC PosD

TWO DEGREE OF FREEDOM POSITION CONTROL METHOD, TWO DEGREE OF FREEDOM POSITION CONTROL DEVICE, AND MEDIUM STORAGE DEVICE

CROSS-REFERENCE TO RELATED APPLICATIONS

This application is based upon and claims the benefit of priority from the prior Japanese Patent Application No. 2006-256604, filed on Sep. 22, 2006, the entire contents of which are incorporated herein by reference.

BACKGROUND OF THE INVENTION

1. Field of the Invention

The present invention relates to a two degree of freedom position control method, two degree of freedom position control device and medium storage device using both feedback and feed forward, and more particularly to a two degree of freedom position control method, two degree of freedom position control device and medium storage device for performing two degree of freedom control using observer control.

2. Description of the Related Art

A device for controlling the position of an object to a target position is widely used. For example, this device is used for seek control for moving a head to a target track, which is one of the positioning controls of a disk device, such as a magnetic disk device and an optical disk device.

A method for this seek control is using two degree of freedom control. In the two degree of freedom control, a target position is provided via a filter while forming a feedback loop. In other words, the transfer function from a target position to an observation position is set to be a form of a low pass filter. By this, overshoot (overrun) can be suppressed effectively.

In the observer control system which is generally used for disk devices as well, two degree of freedom control system can be constructed. In this case, the control system has a form of a second degree low pass filter (hereafter called LPF), which has a same pole as the feedback pole. FIG. 12 is a block diagram of a two degree of freedom control of a prior art.

As FIG. 12 shows, a target trajectory generation section 100 generates a target trajectory r(n) from a target position r. The target trajectory r(n) indicates a target position which moves between samples determined for each sample. A position error computing section 102, on the other hand, computes an error y[n] between the target position 'r' and a current position 'y' observed from a plant 106. A controller 104 receives the target trajectory r(n) and the position error y[n], performs the computation of the two degree of freedom observer, calculates a drive command value of the plant 106, and drives the plant 106.

As an observer used for the controller 104, a two degree of freedom control observer, shown in FIG. 13 and FIG. 14, has been proposed (e.g. "Digital Control of Dynamic Systems", (by Gene F. Franklin and two others, published by Addison-Wesley, 1998)). As FIG. 13 shows, an observer (estimator) 104-1 is used for the controller 104. This estimator 104-1 computes the output u[n] from the current position 'y' of the plant 106 and the output to the plant 106, and multiplies its output by an open loop gain K in a gain multiplication block 104-2, and the result is fed back.

In a multiplication block 104-4, the target trajectory r[n] is multiplied by a coefficient N, the result is output to an addition block 104-3 and added to the output of the gain multiplication block 104-2 so as to calculate the output u[n] to the plant 106.

FIG. 14 shows a simplified observer of this two degree of freedom control which is expressed by the following Expressions (1), (2) and (3).

$$Xh(n)=Xb(n)+L(y(n)-C \cdot Xb(n)) \tag{1}$$

$$u(n)=-F \cdot Xh(n) \tag{2}$$

$$Xb(n+1)=A \cdot Xh(n)+B \cdot u(n) \tag{3}$$

In other words, the difference between the observation position y(n) in the current sample 'n' and the estimated position C·Xb(n) of the current sample estimated with the previous sample is computed in a computation block 202, and an estimated position error er[n] is generated. In a multiplication block 204, this estimated position error er[n] is multiplied by an estimated gain L so as to generate a correction value.

In an addition block 206, this correction value and Xb[n] such as an estimated position and an estimated velocity, are added. By this, Xh(n), such as an estimated position and estimated velocity in the current sample, is generated using Expression (1). In the case of ordinary state feedback, the estimated position of the estimated state Xh(n) is multiplied by a gain, and estimated velocity is multiplied by the gain, and the sum thereof is determined to generate state feedback current.

In the above mentioned two degree of freedom control, the value when the estimated velocity is multiplied by the gain is still used, but the difference value between the estimated position Xh(n) and the target position trajectory r(n) is computed in the addition block 210, the result is multiplied by the feedback gain F in a multiplication block 212, and this result is used for the state feedback. In other words, Expression (2) is computed.

On the other hand, the estimated state Xb(n+1) of the next sample (n+1) is computed from the estimated state Xh(n) in the current sample and the output value u(n) using Expression (3) in multiplication blocks 214 and 216 and an addition block 218.

Here A, B, C, C^T, L and F are matrixes for position x, velocity v, bias value b and disturbance values d1 and d2. A, B and L are state estimate gains, F is a feedback gain, and C and C^T (transposed matrix) are given by the following Expression (4) and (5).

$$C = (1\ 0\ 0\ 0\ 0) \tag{4}$$

$$C^T = \begin{pmatrix} 1 \\ 0 \\ 0 \\ 0 \\ 0 \end{pmatrix} \tag{5}$$

The current observer indicated by Expression (1), Expression (2) and Expression (3) and FIG. 14 can implement two degree of freedom control only by multiplying the target trajectory r(n) by C^T of Expression (5), and adding the result to the normal current observer.

The above mentioned two degree of freedom control of prior art suggests a single rate control, which means that the drive current is changed once in one sample, as shown in FIG. 15. In other words, as FIG. 15 shows, the position in a current sample 'n' is observed, two degree of freedom control computation is performed once, and the drive current u(n) is output.

However in digital control, computation processing is performed by a microcontroller, so an output delay time is generated. Along with the recent demand for high-speed moving and high precision positioning, a control delay is becoming conspicuous in a conventional method of estimating the state once in one sample to change the drive current.

For example, in the case of the magnetic disk device, density is set to high, several tens of thousand tracks are on one disk face, and a high moving speed is demanded, so a state change becomes major during calculation even if state is estimated once and the device current is changed once in one state estimation, and an output delay makes highly accurate position control difficult, and an overrun easily occurs.

SUMMARY OF THE INVENTION

With the foregoing in view, it is an object of the present invention to provide a two degree of freedom position control method, two degree of freedom position control device, and medium storage device to prevent an output delay of two degree of freedom control.

It is another object of the present invention to provide a two degree of freedom position control method, two degree of freedom position control device, and medium storage device for implementing high precision position control even if two degree of freedom control is performed.

It is still another object of the present invention to provide a two degree of freedom position control method, two degree of freedom position control device and medium storage device for changing output a plurality of times in one sample.

It is still another object of the present invention to provide a two degree of freedom position control method, two degree of freedom position control device and medium storage device for decreasing calculation processing time, and preventing a decrease of phase margin and response deterioration.

To achieve these objects, a position control method for controlling a position of an object to a target position by an actuator according to the present invention, has: a step of computing a position error based on a target position of the object and a current position of the object; a step of correcting an estimated position in a current sample by an estimated position error between the position error and an estimated position in a current sample of a current observer; a step of computing a difference between the corrected estimated position and a target trajectory in the current sample, and computing an estimated position advanced by a predetermined time from the sample point of time based on an output value in one sample before and the difference; a step of computing an output value to the actuator based on the advanced estimated position; and a step of computing an estimated position for the next output value computation based on the corrected estimated position, the output value in the current sample and the output value in one sample before.

A medium storage device according to the present invention, has: a head for at least reading data on a disk storage medium; an actuator for positioning the head to a predetermined position of the storage medium; and a control unit for computing a position error from a target position of the head and a current position acquired from the head, and computing an output value for driving the actuator by a current observer control, wherein the control unit corrects an estimated position in a current sample by an estimated position error between the position error and an estimated position in a current sample of the current observer, computes a difference between the corrected estimated position and a target trajectory in the current sample, and computes an estimated position advanced by a predetermined time from the sampling point of time based on an output value in one sample before and the difference, computes an output value to the actuator from the advanced estimated position, and computes an estimated position for the next output value computation based on the corrected estimated position, the output value in the current sample, and the output value in one sample before.

A position control device according to the present invention is a position control device for controlling a position of an object to a target position by an actuator, having: a block of computing a position error based on a target position of the object and a current position of the object; and a current observer for correcting an estimated position in a current sample by an estimated position error between the position error and an estimated position in a current sample, computing a difference between the corrected estimated position and a target trajectory in the current sample, computing an estimated position advanced by a predetermined time from the sample point of time based on an output value in one sample before and the difference, computing an output value to the actuator based on the advanced estimated position, and computing an estimated position for the next output value computation based on the corrected estimated position, the output value in the current sample, and the output value in one sample before.

It is preferable that the present invention further has: a step of computing a difference between an estimated position for computing the next output value and a target trajectory at the time of (current sample+0.5 sample), and computing an estimated position which is advanced by 0.5 sample from the sample point of time based on the output value in the 0.5 sample before, the output value in the current sample and the difference; a step of computing an output value to the actuator based on the advanced estimated position; and a step of computing an estimated position in the next sample based on the corrected estimated position, the output value of the current sample, the output value in 0.5 sample before, and the calculated output value.

In the present invention, it is preferable that the step of computing the advanced estimated position further has a step of correcting an estimated position for computing the next output value using the estimated position error.

It is preferable that the present invention further has a step of generating a target trajectory at each sample point of time based on the target position.

It is preferable that the present invention further has a step of generating a target trajectory between each sample point of time and a point of time advanced by a 0.5 sample from this sample point of time based on the target position.

In the present invention, it is preferable that the step of computing the position error further has a step of computing a position error between a current position acquired from the output of a head which at least reads data of a storage medium and a target position for driving the actuator and moving the head to a predetermined position of the storage medium.

In the two degree of freedom control system for preventing overrun, the delay of output of the two degree of freedom control (computing delay and hardware delay of the drive amplifier, D/A amplifier, etc.) is considered, and the estimated state of Td, which is advanced by the amount of delay from the sample point of time, is computed, then the output is computed based on this estimated state, so even if the state changes during calculation from the sample point of time, the influence of the output delay can be prevented, and highly accurate position control can be performed, therefore an overrun can be prevented.

Also since the two degree of freedom control terms are calculated at a same sample time, the calculation sequence can be prevented from becoming complicated, and the calculation can be performed at high-speed. Also the state estimation sequence can be adhered to, so stability of the entire system can be maintained. Also the current waveform becomes smooth, which contributes to decreasing the seek time of the medium storage device and the prevention of overrun.

DESCRIPTION OF THE PREFERRED EMBODIMENTS

Embodiments of the present invention will now be described in the sequence of the medium storage device, first embodiment, second embodiment, third embodiment and other embodiments of the two degree of freedom position control system, but the present invention is not limited to these embodiments.

Medium Storage Device

Figure 1:
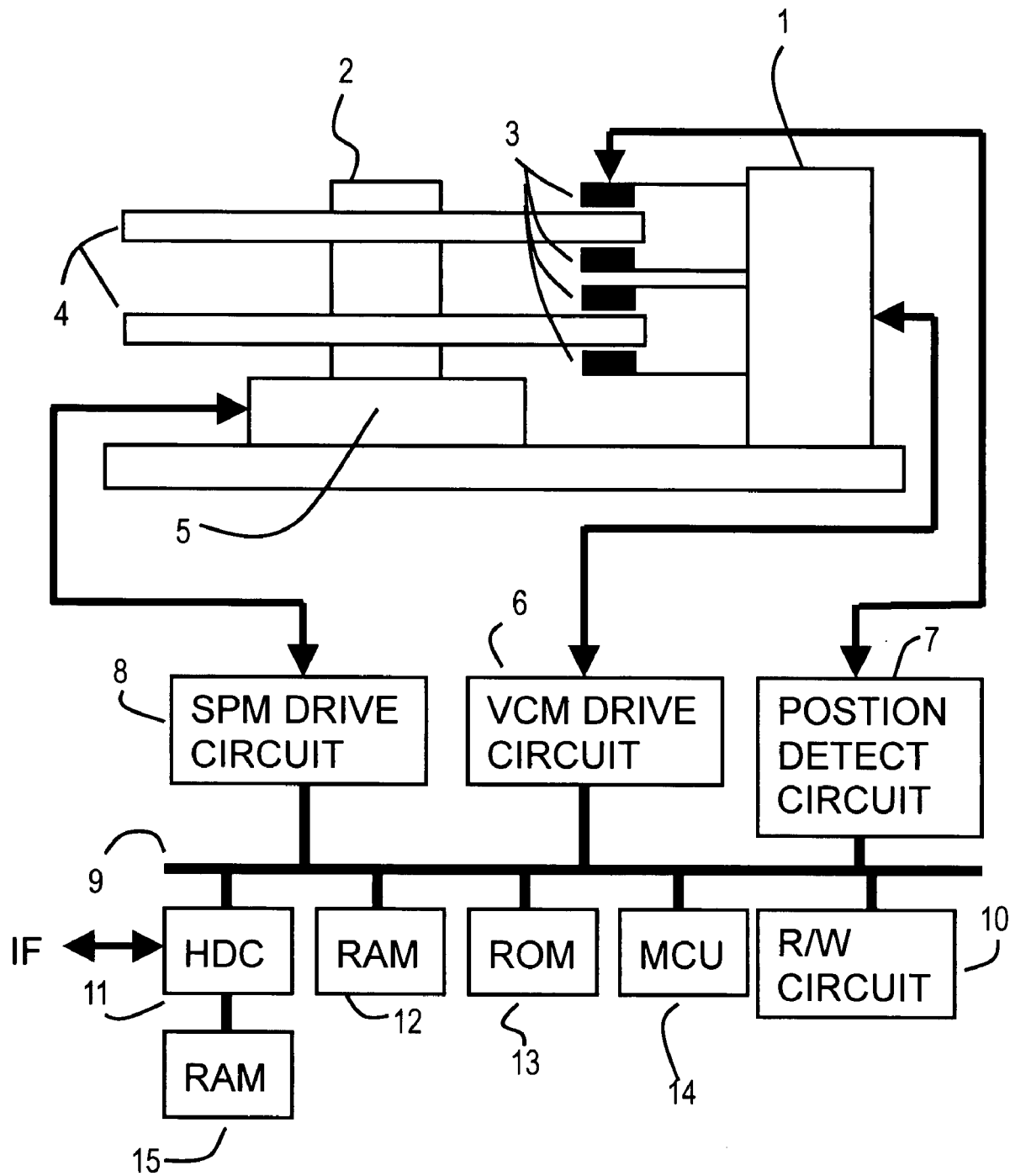
FIG. 1 is a block diagram depicting a medium storage device according to an embodiment of the present invention.
Figure 2:
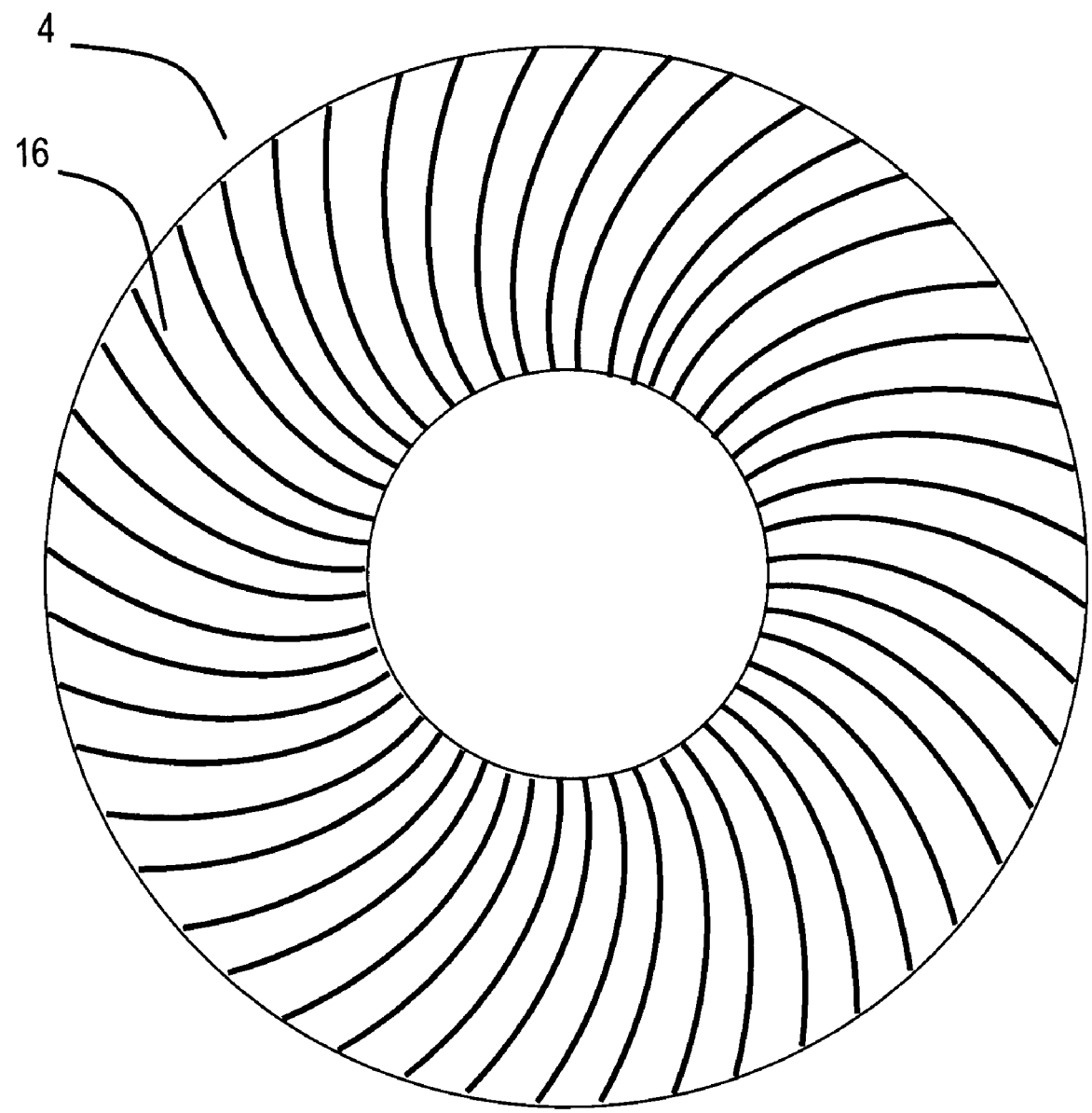
FIG. 2 is a diagram depicting the position signals of the disk in FIG. 1.
Figure 3:
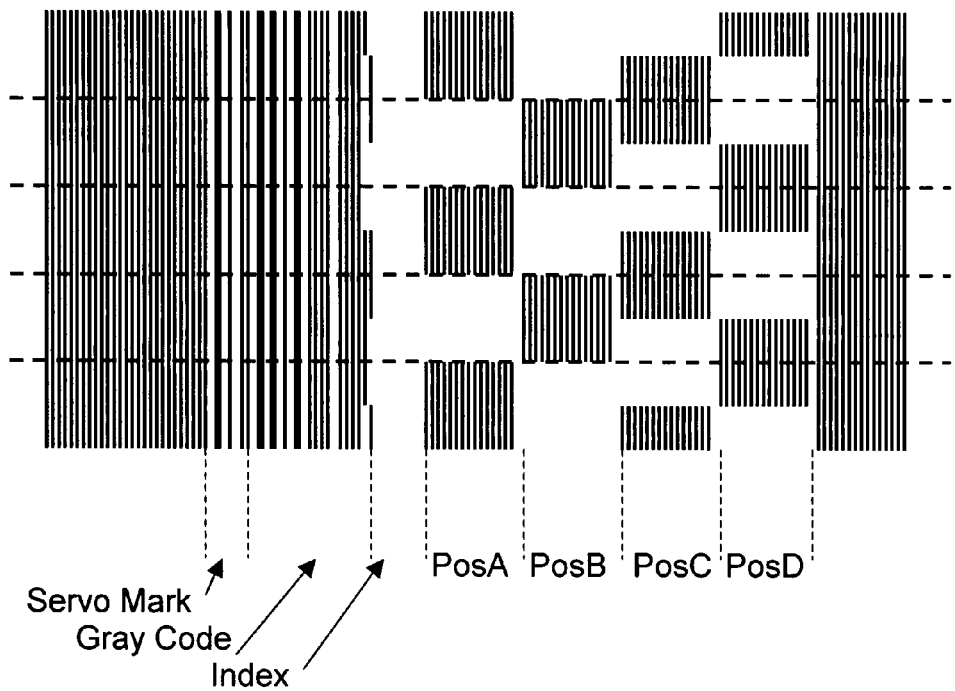
FIG. 3 is a diagram depicting details of the position signals in FIG. 2.
Figure 4:
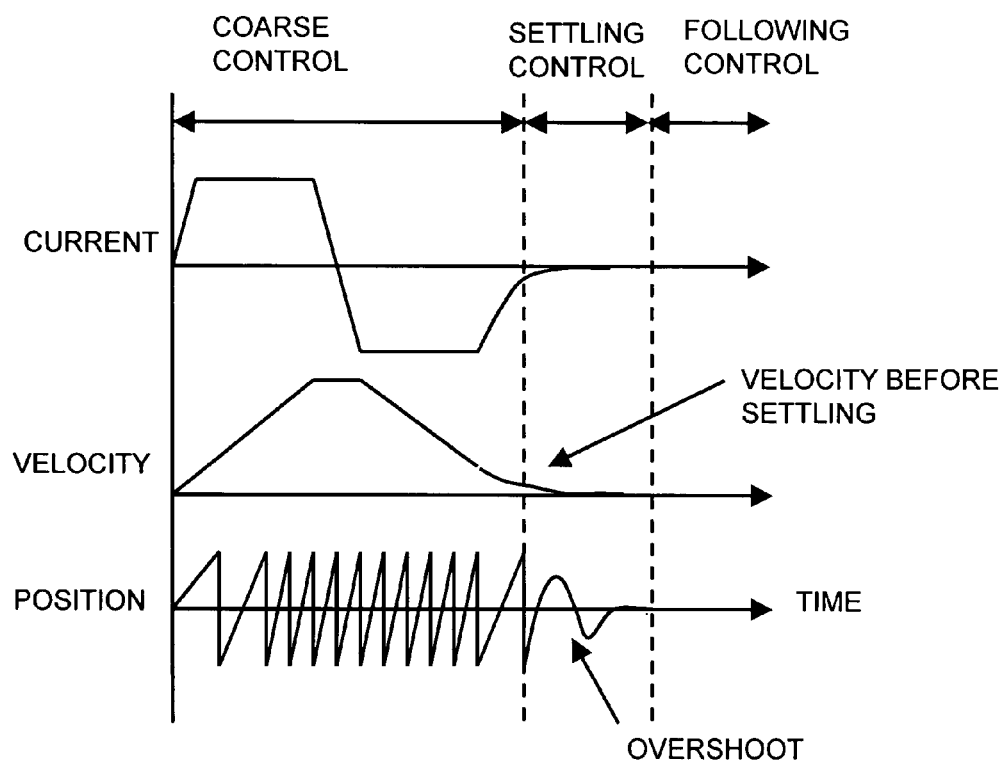
FIG. 4 is a diagram depicting the transition of the seek control according to an embodiment of the present invention.

FIG. 1 is a block diagram depicting a medium storage device according to an embodiment of the present invention, FIG. 2 is a diagram depicting the arrangement of position signals of a magnetic disk in FIG. 1, FIG. 3 is a diagram depicting the position signals of the magnetic disk in FIG. 1 and FIG. 2, and FIG. 4 is a diagram depicting the control transition of seek control.

FIG. 1 shows a magnetic disk device as a medium storage device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1. The magnetic head 3 has a read element and a write element. The magnetic head 3 is comprised of a read element, including a magneto-resistance (MR) element, stacked on a slider, and a write element, including a write coil, stacked thereon.

A position detection circuit 7 converts the position signals (analog signals) read by the magnetic head 3 into digital signals. A read/write (R/W) circuit 10 controls reading and writing of the magnetic head 3. A spindle motor (SPM) drive circuit 8 drives the spindle motor 5. A voice coil motor (VCM) drive circuit 6 supplies drive current to the voice coil motor (VCM) 1, and drives the VCM 1.

A microcontroller (MCU) 14 detects (demodulates) the current position from the digital position signals from the position detection circuit 7, and computes a VCM drive command value according to an error between the detected current position and a target position. In other words, the microcontroller 14 performs position demodulation and servo control (current observer control), including the disturbance suppression described in FIG. 5 and later. A read only memory (ROM) 13 stores a control program of the MCU 14. A random access memory (RAM) 12 stores data for processing of the MCU 14.

A hard disk controller (HDC) 11 judges a position in one track based on a sector number of a servo signal, and records/reproduces the data. A random access memory (RAM) for buffer 15 temporarily stores the read data or write data. The HDC 11 communicates with a host via an interface IF, such as USB (Universal Serial Bus), ATA or SCSI (Small Computer System Interface). A bus 9 connects these composing elements.

As FIG. 2 shows, on the magnetic disk 4, servo signals (position signals) 16 are arrayed in each track in the circumferential direction from the outer circumference to the inner circumference with an equal interval. Each track has a plurality of sectors, and the solid lines in FIG. 2 indicate a position where the servo signals 16 are recorded. As FIG. 3 shows, the position signal is comprised of a servo mark ServoMark, track number GrayCode, index Index, and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded/reproduced. There is one index signal in one track. The sector number may be set instead of the index signal.

The MCU 14 in FIG. 1 confirms the position of the actuator 1 through the position detection circuit 7, performs servo computation, and supplies appropriate current to the VCM 1. In other words, as FIG. 4 shows, in seek control, the head is moved to the target position through the transition from coarse control, settling control and following control. For all these controls, the current position of the head must be detected.

To confirm the position like this, the servo signals are recorded on the magnetic disk in advance, as mentioned in FIG. 2. In other words, as FIG. 3 shows, servo marks which indicate the start potion of the servo signal, gray code which indicates the track number, index signal, and signals PosA to PosD which indicate the offset are recorded on the magnetic disk in advance. These signals are read by the magnetic head, and these servo signals are converted into digital values by the position detection circuit 7.

First Embodiment of Two Degree of Freedom Position Control System

Figure 5:
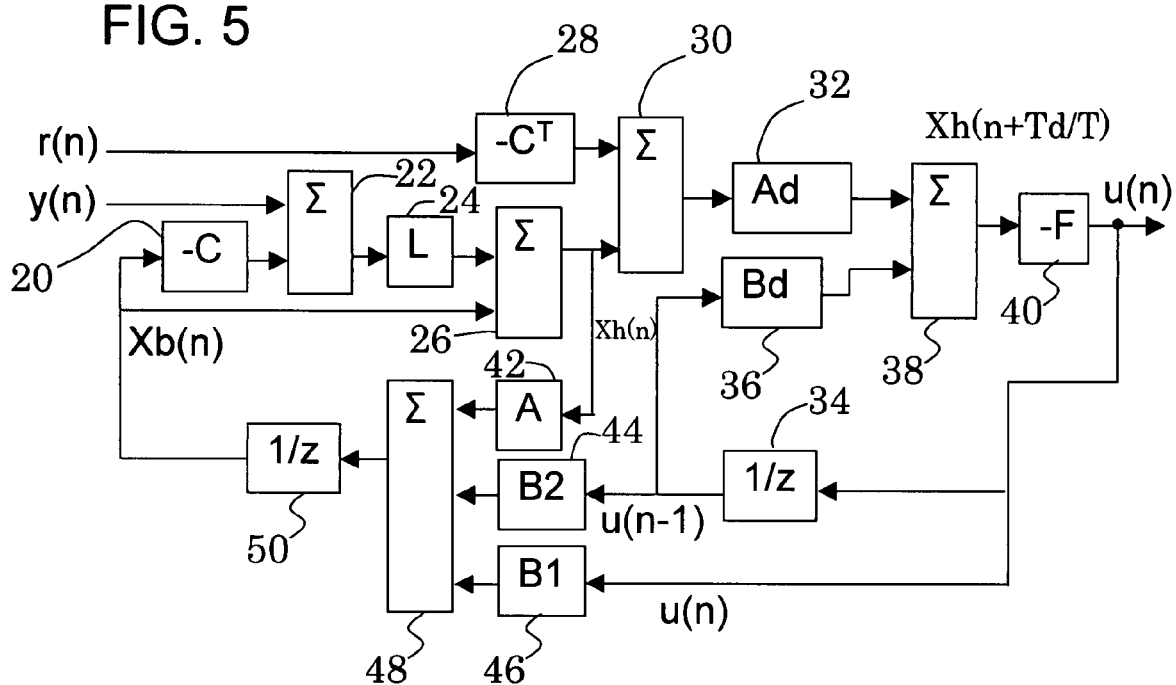
FIG. 5 is a block diagram depicting a current observer according to the first embodiment of the present invention.
Figure 6:
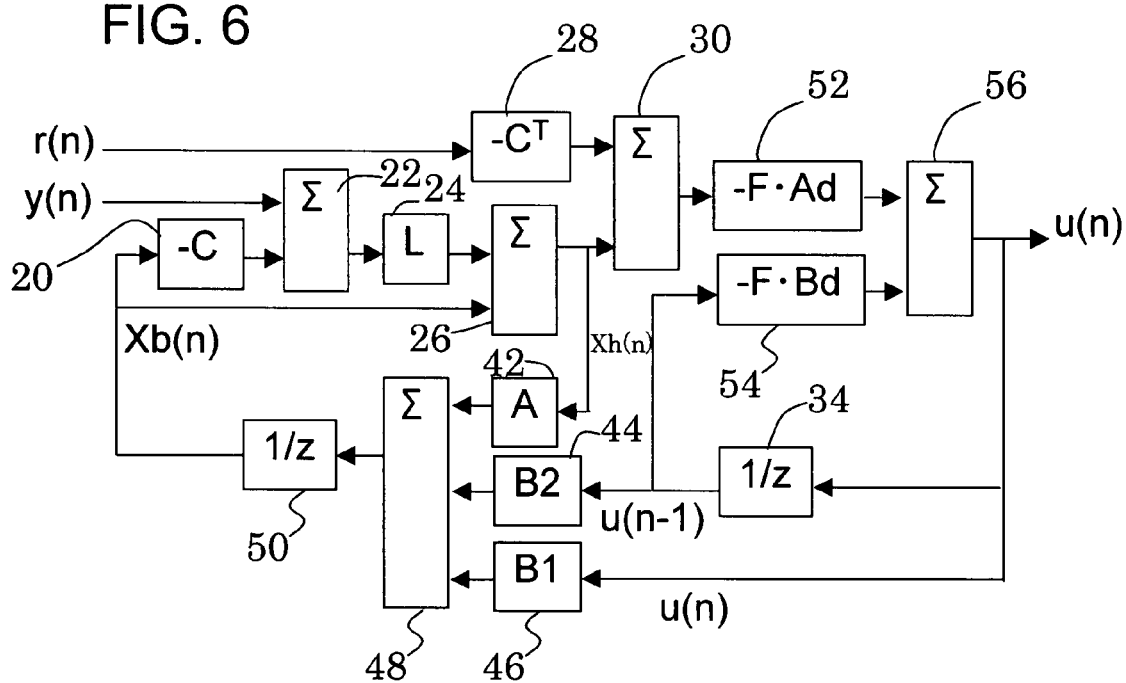
FIG. 6 is a block diagram depicting a variant form of FIG. 5.
Figure 7:
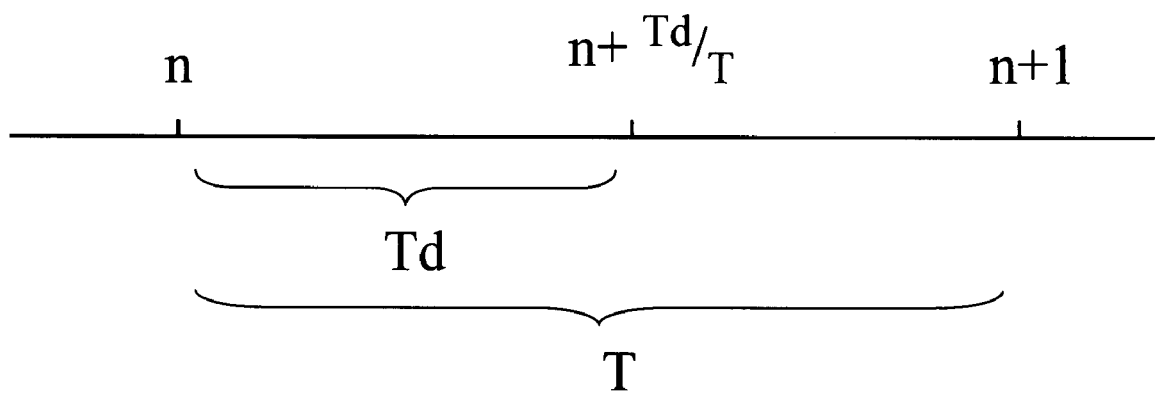
FIG. 7 is a diagram depicting the operation sequence in FIG. 5 and FIG. 6.
Figure 7:
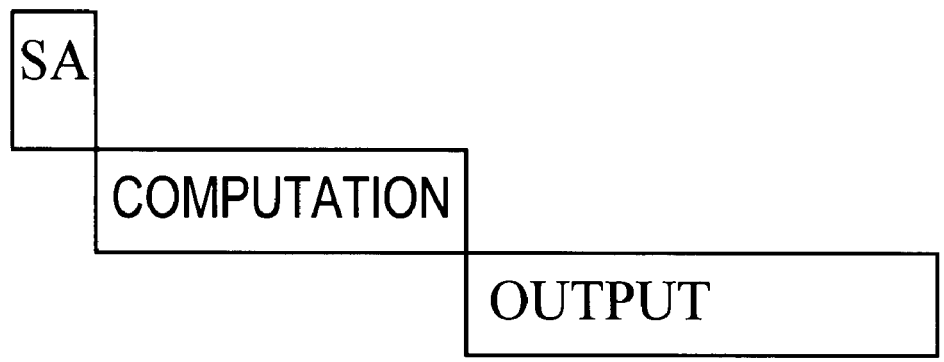
Figure 7:
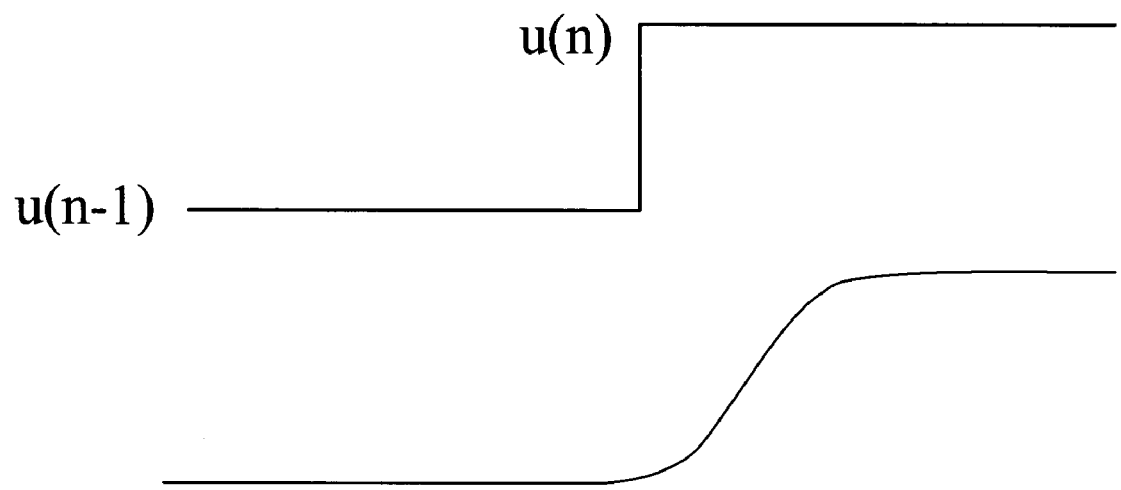

FIG. 5 is a block diagram depicting a first embodiment of the position control system of the present invention, and is a block diagram of the position control system for suppressing disturbance which is executed by the MCU 14 in FIG. 1. FIG. 6 is a block diagram depicting a variant form of FIG. 5, and FIG. 7 is a diagram depicting the control sequence of FIG. 5 and FIG. 6.

FIG. 5 shows a two degree of freedom position control system using a current observer which is executed by the MCU 14 in FIG. 1. First the current observer will be described. The actuator of the magnetic disk device is a rotation type. However this can be converted into and expressed as a state equation of a linear actuator shown in Expression (6). Here 'x' is a position (m), 'v' is a velocity (m/s), 'u' is a current (Ampere), B1 is a force constant (N/m), 'm' is an equivalent mass (kg), 'u' is an output, and 's' is a Laplace operator.

$$s \begin{pmatrix} x \\ v \end{pmatrix} = \begin{pmatrix} 0 & 1 \\ 0 & 0 \end{pmatrix} \begin{pmatrix} x \\ v \end{pmatrix} + \frac{Bl}{m} \begin{pmatrix} 0 \\ 1 \end{pmatrix} u \qquad (6)$$

If the sampling cycle is T(s), the maximum value of the current is Imax (Ampere), and the track width is Lp (m/track), and the unit of position is converted into tracks, the unit of velocity into track/sample, and the unit of current into Imax="1", and Expression (6) is expressed as a digital state equation, then the following Expression (7) is acquired.

$$s \begin{pmatrix} x \\ v \end{pmatrix} = \begin{pmatrix} 0 & 1 \\ 0 & 0 \end{pmatrix} \begin{pmatrix} x \\ v \end{pmatrix} + \frac{Bl}{m} \begin{pmatrix} 0 \\ 1 \end{pmatrix} u \qquad (7)$$

Now in order to estimate a steady state bias, the following Expression (8), where the steady state bias is constant, is assumed. Here 's' is a Laplace operator.

$$sb = 0 \qquad (8)$$

This is converted into a digital space, and the following Expression (9) is acquired.

$$b(n+1) = b(n) \qquad (9)$$

As a disturbance model, the characteristics of the quadratic expression of the following Expression (10) are set.

$$\frac{1}{s^2 + 2\zeta \omega s + \omega^2} \qquad (10)$$

The analog state equation of the disturbance model of Expression (10) is expressed as the following Expression (11).

$$s \begin{pmatrix} d1 \\ d2 \end{pmatrix} = \begin{pmatrix} 0 & -\omega \\ \omega & -2\zeta \omega \end{pmatrix} \begin{pmatrix} d1 \\ d2 \end{pmatrix} \qquad (11)$$

This Expression (11) is converted into a digital space, and the following Expression (12) is acquired.

$$\begin{pmatrix} d1(n+1) \\ d2(n+1) \end{pmatrix} = \begin{pmatrix} Ad11 & Ad12 \\ Ad21 & Ad22 \end{pmatrix} \begin{pmatrix} d1(n) \\ d2(n) \end{pmatrix} \qquad (12)$$

When Expression (7), Expression (9) and Expression (12) are integrated into an extended model, the following Expression (13) is acquired. Here both the steady state bias in Expression (9) and the disturbance expressed as the quadratic expression in Expression (12) are included.

$$\begin{pmatrix} x(n+1) \\ v(n+1) \\ b(n+1) \\ d11(n+1) \\ d12(n+1) \\ d21(n+1) \\ d22(n+1) \end{pmatrix} = \begin{pmatrix} 1 & 1 & \frac{1}{2} & \frac{1}{2} & 0 & \frac{1}{2} & 0 \\ 0 & 1 & 1 & 1 & 0 & 1 & 0 \\ 0 & 0 & 1 & 0 & 0 & 0 & 0 \\ 0 & 0 & 0 & a11 & a12 & 0 & 0 \\ 0 & 0 & 0 & a21 & a22 & 0 & 0 \\ 0 & 0 & 0 & 0 & 0 & b11 & b12 \\ 0 & 0 & 0 & 0 & 0 & b21 & b22 \end{pmatrix} \begin{pmatrix} x(n) \\ v(n) \\ b(n) \\ d11(n) \\ d12(n) \\ d21(n) \\ d22(n) \end{pmatrix} + \frac{Bl}{m} \frac{I_{MAX}}{Lp} T^2 \begin{pmatrix} \frac{1}{2} \\ 1 \\ 0 \\ 0 \\ 0 \\ 0 \\ 0 \end{pmatrix} u(n) \qquad (13)$$

$$y(n) = (1\ 0\ 0\ 0\ 0\ 0\ 0) \begin{pmatrix} x(n) \\ v(n) \\ b(n) \\ d11(n) \\ d12(n) \\ d21(n) \\ d22(n) \end{pmatrix}$$

The extended model, including the model of the actuator in Expression (13), and one or a plurality of disturbance models is simplified and expressed as Expression (14).

$$\left. \begin{array}{l} X(n+1) = A \cdot X(n) + B \cdot u(n) \\ y(n) = C \cdot X(n) \end{array} \right\} \qquad (14)$$

Expression (14) is simplified by expressing the matrices in Expression (13) as X(n+1), x(n), A, B and C. According to Expression (14), the predicated observer is expressed as Expression (15).

$$\left. \begin{array}{l} X(n+1) = A \cdot X(n) + B \cdot u(n) + L \cdot (y(n) - C \cdot X(n)) \\ u(n) = -F \cdot X(n) \end{array} \right\} \qquad (15)$$

This expression is the expression of the analog control observer directly converted into a digital expression, where L is a state expression gain, which consists of four state estimation gains, that is, position, velocity, bias and disturbance (five state estimation gains in the case of Expression (13) since there are two disturbances). F is a feedback gain, and consists of five feedback gains.

In this expression, the observation position y(n) is not reflected to the current output u(n) of the current sample. In other words, the response delays one sample since this is a predicted observer format. To compensate the one sample of delay, the current observer is normally used. The current observer is expressed by Expression (16). Here y(n) is an observation position in the current sample.

$$\left.\begin{array}{l} Xh(n) = Xb(n) + L(y(n) - C \cdot Xb(n)) \\ u(n) = -F \cdot Xh(n) \\ Xb(n+1) = A \cdot Xh(n) + B \cdot u(n) \end{array}\right\} \quad (16)$$

In this way, a current observer for performing one operation and changing the drive current once in one sample is constructed. Then from this current observer, the configuration of the current observer, considering the output delay, is determined. As FIG. 7 shows, the state variable X at a time delayed (advanced) by Td from the sample time n is determined in the same way as Expression (15), then this is expressed as the following Expression (17).

$$X(n+Td/T) = Ad \cdot X(n) + Bd \cdot u(n-1) \quad (17)$$

If Expression (17) is expressed as the model of the actuator, just like Expression (7), then this is expressed as Expression (18). In Expression (18), Td, which is a time unit, is converted into sample count n, by driving Td by the sampling cycle T.

$$\begin{pmatrix} x(n+Td/T) \\ v(n+Td/T) \end{pmatrix} = \quad (18)$$

$$\begin{pmatrix} 1 & Td/T \\ 0 & 1 \end{pmatrix}\begin{pmatrix} x(n) \\ v(n) \end{pmatrix} + \frac{Bl}{m}\frac{I_{MAX}}{Lp}T^2\begin{pmatrix} Td^2/T^2/2 \\ Td/T \end{pmatrix}u(n-1)$$

The steady state bias b, which is always constant, is given by the following Expression (19).

$$b(n+Td/T) = b(n) \quad (19)$$

The other disturbance models can be transformed in the same way as Expressions (17) and (18) according to Expression (12). For this transformation, z-transformation is used. If the above mentioned Expression (16) of the current observer and the above expression are combined, the following Expression (20) can be constructed.

$$\left.\begin{array}{l} Xh(n) = Xb(n) + L(y(n) - C \cdot Xb(n)) \\ Xh(n+Td/T) = Ad \cdot Xh(n) + Bd \cdot u(n-1) \\ u(n) = -F \cdot Xh(n+Td/T) \\ Xb(n+1) = A \cdot Xh(n) + B1 \cdot u(n) + B2 \cdot u(n-1) \end{array}\right\} \quad (20)$$

In Expression (20), Xh(n) is an estimated state in the current sample n, and Xh(n+Td/T) is an estimated state advanced by Td from the current sample n.

In Expression (20), the estimated state Xh(n) in the current sample n is determined, then the state Xh(n+Td/T) advanced by time Td, considering delay, is calculated based on the estimated state Xh(n) in the current sample n and the output value u(n−1) in the previous sample.

Here in order to estimate the state in the next sample, the output u(n) in the current sample is normally used as shown in Expression (3), but in this example, which is single rate control where output is once in one sample, u(n) is not calculated at a sample point of time. Therefore the already calculated output u(n−1) in the previous sample is used, and the state Xh(n+Td/T) advanced by time Td is calculated. And based on the calculated state Xh(n+Td/T) advanced by time Td, the output u(n) in the current sample n is calculated.

For the estimated state Xb(n+1) of the next sample, u(n) and u(n−1) are used for Expression (20), unlike Expression (16). Here the position x(n+1) and velocity v (n+1) of the estimated state Xb(n+1) of Expression (20) are given by the following Expression (21).

$$\begin{pmatrix} x(n+1) \\ v(n+1) \end{pmatrix} = \begin{pmatrix} 1 & 1 \\ 0 & 1 \end{pmatrix}\begin{pmatrix} x(n) \\ v(n) \end{pmatrix} + \quad (21)$$

$$\frac{Bl}{m}\frac{I_{MAX}}{Lp}\left\{\begin{pmatrix} (T-Td)^2/2 \\ T(T-Td) \end{pmatrix}u(n) + \begin{pmatrix} (2T-Td)Td/2 \\ T \cdot Td \end{pmatrix}u(n-1)\right\}$$

The coefficient of u(n) of Expression (21) is B1 of Expression (20), and the coefficient of u(n−1) thereof is B2 of Expression (20).

If feed forward of two degree of freedom control is added to Expression (20), Expression (22) is acquired.

$$\left.\begin{array}{l} Xh(n) = Xb(n) + L(y(n) - C \cdot Xb(n)) \\ Xh(n+Td/T) = Ad \cdot (Xh(n) - C^T \cdot r(n)) + Bd \cdot u(n-1) \\ u(n) = -F \cdot Xh(n+Td/T) \\ Xb(n+1) = A \cdot Xh(n) + B1 \cdot u(n) + B2 \cdot u(n-1) \end{array}\right\} \quad (22)$$

In other words, compared with Expression (20), (C^T·r(n)), which is a feed forward term, is added to the calculation of Xh(n+Td/T).

In this case, according to Expression (2) of a conventional two degree of freedom control, the feed forward term is directly added to the calculation expression of the output u(n). However if this is used, (C^T·r(n)) is subtracted from Xh(n+Td/T) at a different sample point of time, which makes the calculation sequence complicated and high-speed computation difficult. Also the state estimation sequences change, and maintaining the stability of the entire system may become difficult.

Therefore the feed forward term (C^T·r(n)) is added to Xh(n) at a same sample point of time, and Xh(n+Td/T) in an advanced state is calculated.

FIG. 5 is a block diagram when Expression (22) is blocked. As FIG. 5 shows, the observation position (position error) y(n) in the current sample n is loaded, and the difference between the predicted position C·Xb(n) in the current sample estimated in the previous sample and the observation position y(n) is computed in the computation block 22, and the estimated position error er[n] is generated. This estimated position error er[n] is multiplied by the estimated gain L in the multiplication block 24, so as to generate a correction value.

In the addition block 26, this correction value and estimated state Xb[n], such as a predicted position and predicted velocity, in the current sample, are added. By this, the estimated state Xh(n), such as the estimated position and estimated velocity, in the current sample of Expression (22) is generated.

And in the two degree of freedom control, the difference value between the estimated state (position) Xh(n) and the target position trajectory r(n) is computed in the addition block 30, and the result is multiplied by a coefficient matrix Ad in the multiplication block 32. On the other hand, the output u(n−1) is multiplied by a coefficient matrix Bd in the multiplication block 36, and this result and the result of the multiplication block 32 are added in the addition block 38, so as to compute a state Xh(n+Td/T) advanced by Td. In other words, the second expression of Expression (22) is computed.

Then in the multiplication block 40, the state Xh(n+Td/T) is multiplied by the feedback gain F, and the output value u(n) of the third expression of Expression (22) is acquired. On the other hand, the estimated state Xb(n+1) in the next sample (n+1) is calculated as shown in the fourth expression of Expression (22) in the multiplication blocks 42, 44 and 46 and the addition block 48 based on the estimated state Xh(n) in the current sample, output value u(n) and the output value u(n−1) in the previous sample delayed by the delay block 34.

The estimated state Xb(n+1) in the next sample (n+1) is delayed in the delay block 50, and in the multiplication block 20, the output of the delay block 50 is multiplied by C so as to calculate the estimated position x(n) in the current sample.

As described above, in a two degree of freedom control system for preventing overrun, the delay of output of the two degree of freedom control (computing delay and hardware delay of drive amplifier, D/A converter, etc.) is considered, and the estimated state of Td which is advanced by the amount of delay from the sample point of time is computed, then the output is computed based on this estimated state, so even if state changes during calculation from the sample point of time, the influence of an output delay can be prevented, therefore highly accurate position control is possible, and overrun can be prevented.

Also the two degree of freedom control terms are calculated at a same sample time, the calculation sequence can be prevented from becoming complicated, and calculation can be performed at high-speed. Also the state estimation sequence can be adhered to, so stability of the entire system can be maintained.

FIG. 6 is a block diagram depicting a variant form of FIG. 5. The configuration in FIG. 6 is a current observer for simplifying Expression (22) and computing the following Expression (23).

$$\left.\begin{array}{l} Xh(n) = Xb(n) + L(y(n) - C \cdot Xb(n)) \\ u(n) = -F \cdot Ad \cdot (Xh(n) - C^T \cdot r(n)) - F \cdot Bd \cdot u(n-1) \\ Xb(n+1) = A \cdot Xh(n) + B1 \cdot u(n) + B2 \cdot u(n-1) \end{array}\right\} \quad (23)$$

In other words, Expression (23) is acquired by substituting the second expression of Expression (22) for the third expression.

In FIG. 6, composing elements the same as FIG. 5 are denoted with the same reference symbols, and the three multiplication blocks 32, 36 and 40 in FIG. 5 are integrated into two multiplication blocks 52 and 54. By this configuration, expressions can be simplified, and computation time can be effectively decreased.

Second Embodiment of Two Degree of Freedom Position Control System

Figure 8:
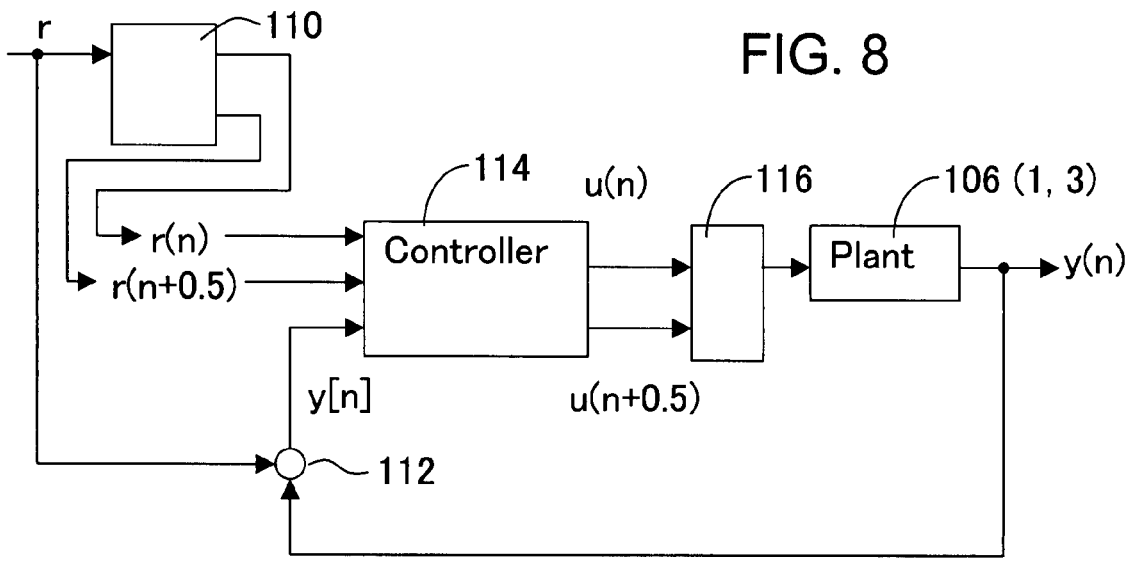
FIG. 8 is a block diagram depicting the current observer according to the second embodiment of the present invention.
Figure 9:
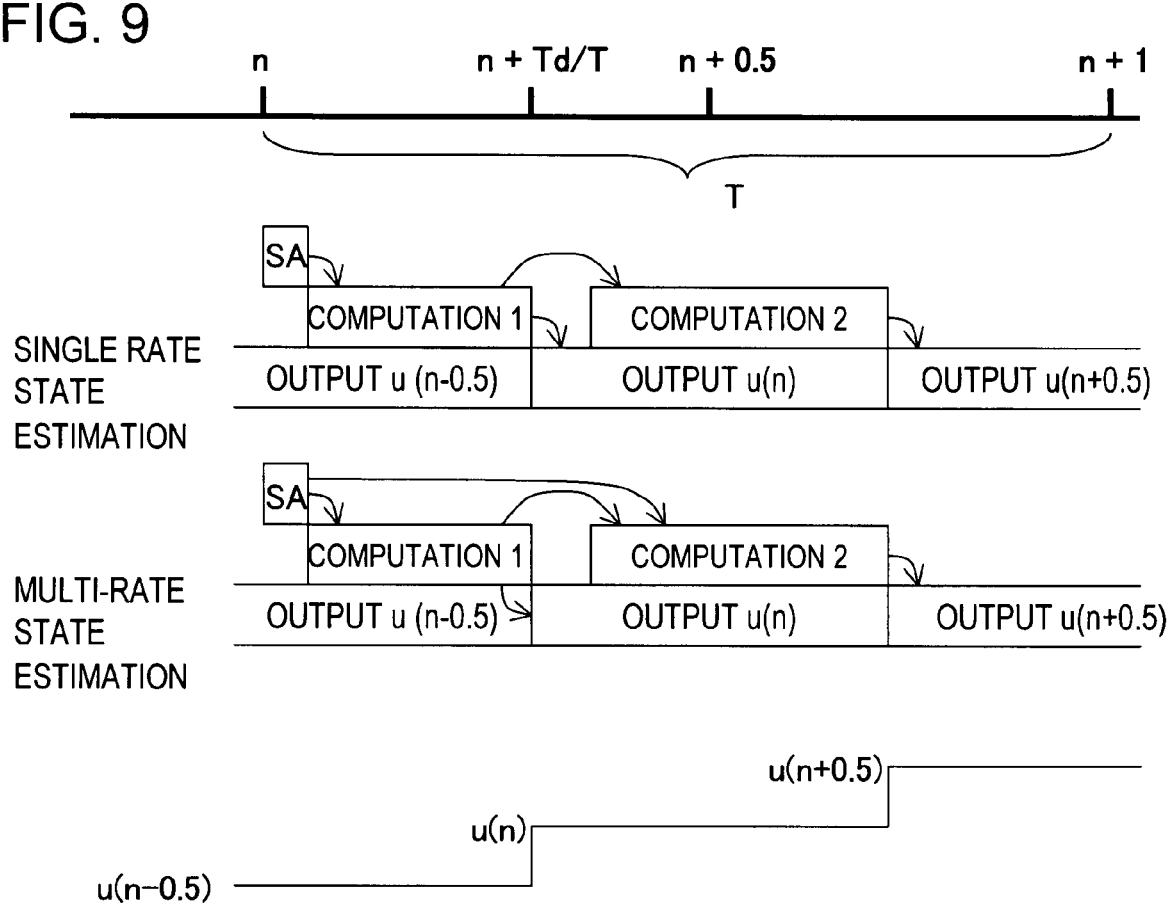
FIG. 9 is a diagram depicting the operation sequence in FIG. 8.

FIG. 8 is a block diagram depicting the second embodiment of the two degree of freedom control system of the present invention, and FIG. 9 is an operation sequence diagram thereof. FIG. 8 and FIG. 9 show the configuration of a two degree of freedom control system using double multi-rate control.

Multi-rate control changes current two or three times in one sample, as shown in FIG. 8 and FIG. 9. Changing twice is called "double multi-rate configuration", and changing three times is called "triple multi-rate configuration".

As the double multi-rate configuration in FIG. 8 shows, a target trajectory generation section 110 generates a target trajectory r(n) in the sample(n) and a target trajectory r(n+0.5) in the sample (n+0.5) in each sample based on the target position r, and sends them to a controller 114. A position error computing section 112 computes a position error y(n) from an observed current position y (observation position) based on the target position r and plant 106.

The controller 114 performs two degree of freedom observer computation based on the target trajectory r(n) and position error y(n) in the nth sample, calculates a drive command value u(n) of a plant 106, and drives the plant 106. Also the controller 114 performs two degree of freedom observer computation based on the target trajectory r(n+0.5) and position error y[n] in the sample (n+0.5), calculates a drive command value u(n+0.5) of the plant 106, and drives the plant 106.

As FIG. 9 shows, the multi-rate control has the single rate state estimation for estimating the state at a single rate and the multi-rate state estimation for estimating state at a multi-rate. In both cases, current is computed and changed twice as u(n) and u(n+0.5) in one sample.

First the multi-rate control of the single rate state estimation will be described. In multi-rate control, the current output value is output as u(n) and u(n+0.5) in one sample. Therefore basically Expression (22) is computed twice. In other words, the following Expression (24) and Expression (25) are executed.

$$\left.\begin{array}{l} Xh(n) = Xb(n) + L(y(n) - C \cdot Xb(n)) \\ Xh(n + Td/T) = Ad \cdot (Xh(n) - \\ \quad C^T \cdot r(n)) + Bd1 \cdot u(n - 0.5) + Bd2 \cdot u(n - 1) \\ u(n) = -F \cdot Xh(n + Td/T) \\ Xb(n + 0.5) = A \cdot Xh(n) + B1 \cdot u(n) + \\ \quad B2 \cdot u(n - 0.5) + B3 \cdot u(n - 1) \end{array}\right\} \quad (24)$$

$$\left.\begin{array}{l} Xh(n + 0.5) = Xb(n + 0.5) \\ Xh(n + 0.5 + Td/T) = Ad \cdot (Xh(n + 0.5) - C^T \cdot \\ \quad r(n + 0.5)) + Bd1 \cdot u(n) + Bd2 \cdot u(n - 0.5) \\ u(n + 0.5) = -F \cdot Xh(n + 0.5 + Td/T) \\ Xb(n + 1) = A \cdot Xh(n) + B1 \cdot u(n + 0.5) + \\ \quad B2 \cdot u(n) + B3 \cdot u(n - 0.5) \end{array}\right\} \quad (25)$$

In other words, first Expression (24) is computed to compute the output u(n) and the next state Xb(n+0.5). Expression (24) is basically the same as Expression (22), but u(n−1) and u(n−0.5) are used for computing Xh(n+Td/T) and Xb(n+0.5) since current changes twice in one sample.

And as Expression (25) shows, the estimated state Xh(n+0.5) in the sample (n+0.5) is assumed as the estimated state Xb(n+0.5) in Expression (24), and the output u(n+0.5) and the next state Xb(n+1) are computed using the target trajectory r(n+0.5), just like the case of Expression (24).

Here the coefficients B1, B2 and B3 in Expression (24) and expression (25) depend on the comparison of Td to which delay is added and T/2(=n+0.5), and is determined by the following Expression (26) if Td<T/2.

$$\binom{x(n+0.5)}{v(n+0.5)} = \binom{1 \quad 1/2}{0 \quad 1}\binom{x(n)}{v(n)} + \quad (26)$$

$$\frac{Bl}{m}\frac{I_{MAX}}{Lp}\left\{\binom{(T-2Td)^2/8}{T(T-2Td)/2}u(n) + \binom{(T-Td)Td/2}{T \cdot Td}u(n-0.5)\right\}$$

If T/2<Td<T, on the other hand, the coefficients B1, B2 and B3 are determined by the following Expression (27).

$$\binom{x(n+0.5)}{v(n+0.5)} = \binom{1 \quad 1/2}{0 \quad 1}\binom{x(n)}{v(n)} + \quad (27)$$

-continued $$\frac{Bl}{m}\frac{I_{MAX}}{Lp}\left\{\left(\frac{(T-2Td)^2/8}{T(T-2Td)/2}\right)u(n)+\left(\frac{(T-Td)Td/2}{T\cdot Td}\right)u(n-0.5)\right\}$$

In other words, the coefficient of u(n) of Expressions (26) and (27) is B1 of Expressions (24) and (25), the coefficient u(n−0.5) is B2, and the coefficient of u(n−1) is B3. Therefore if Td<T/2, then coefficient B3 is "0", and if T/2<Td, B1 is "0".

Now multi-rate control in the multi-rate state estimation will be described. In multi-rate control as well, current output values u(n) and u(n+0.5) are output in one sample. Therefore in multi-rate state estimation as well, Expression (22) is basically computed twice. In other words, the following Expressions (28) and (29) are executed.

$$\left.\begin{array}{l}e(n)=y(n)-C\cdot Xb(n)\\ Xh(n)=Xb(n)+L1\cdot e(n)\\ Xh(n+Td/T)=Ad\cdot(Xh(n)-C^T\cdot r(n))+\\ \quad Bd1\cdot u(n-0.5)+Bd2\cdot u(n-1)\\ u(n)=-F\cdot Xh(n+Td/T)\\ Xb(n+0.5)=A\cdot Xh(n)+B1\cdot u(n)+\\ \quad B2\cdot u(n-0.5)+B3\cdot u(n-1)\end{array}\right\} \quad (28)$$

$$\left.\begin{array}{l}Xh(n+0.5)=Xb(n+0.5)+L2\cdot e(n)\\ Xh(n+0.5+Td/T)=Ad\cdot(Xh(n+0.5)-C^T\cdot\\ \quad r(n+0.5))+Bd1\cdot u(n)+Bd2\cdot u(n-0.5)\\ u(n+0.5)=-F\cdot Xh(n+0.5+Td/T)\\ Xb(n+1)=A\cdot Xh(n)+B1\cdot u(n+0.5)+\\ \quad B2\cdot u(n)+B3\cdot u(n-0.5)\end{array}\right\} \quad (29)$$

First in order to compute the output u(n) and the next state Xb(n+0.5), Expression (28) is computed. This Expression (28) is basically the same as Expression (22), but current changes twice in one sample, so u(n−1) and u(n−0.5) are used for computing Xh(n+Td/T) and Xb(n+0.5). The estimated position error e(n) is separately computed by (y(n)−C·Xb(n)).

And as Expression (29) shows, the estimated state Xh(n+0.5) in the sample (n+0.5) is corrected to the estimated state Xb(n+0.5) in Expression (28) by a value when e(n) in Expression (24) is multiplied by L2. Also using the target trajectory r(n+0.5), the output u(n+0.5) and the next state Xb(n+1) are computed, just like Expression (28).

Here the coefficients B1, B2 and B3 in Expression (28) and Expression (29) depend on the comparison of Td to which delay is added and T/2(=n+0.5), and is determined by Expression (26) if Td<T/2, and by Expression (27) if T/2<Td.

The difference from the single rate state estimation in Expression (24) and Expression (25) is that the estimated state Xh(n+0.5) in the sample (n+0.5) is corrected to the estimated state Xb(n+0.5) in Expression (28), using a value when e(n) in Expression (24) multiplied by L2, as shown in Expression (29). In this way, multi-rate state estimation corrects the second estimated state with the position error observed at sample time, just like the first time.

If Xh(n+Td/T) and Xh(n+0.5+Td/T) in Expression (28) and Expression (29) are substituted for other expressions in Expression (28) and Expression (29), Expression (28) and Expression (29) can be transformed to the following Expression (30).

$$\left.\begin{array}{l}e(n)=y(n)-C\cdot Xb(n)\\ Xh(n)=Xb(n)+L1\cdot e(n)\\ u(n)=-F\cdot Ad\cdot(Xh(n)-C^T\cdot r(n))-\\ \quad F\cdot Bd1\cdot u(n-0.5)-F\cdot Bd2\cdot u(n-1)\\ Xb(n+0.5)=A\cdot Xh(n)+B1\cdot u(n)+\\ \quad B2\cdot u(n-0.5)+B3\cdot u(n-1)\\ Xh(n+0.5)=Xb(n+0.5)+L2\cdot e(n)\\ u(n+0.5)=-F\cdot Ad\cdot(Xh(n+0.5)-C^T\cdot r(n+0.5))-\\ \quad F\cdot Bd1\cdot u(n)-F\cdot Bd2\cdot u(n-0.5)\\ Xb(n+1)=A\cdot Xh(n)+B1\cdot u(n+0.5)+\\ \quad B2\cdot u(n)+B3\cdot u(n-0.5)\end{array}\right\} \quad (30)$$

In Expression (30), Xh(n+Td/T) of Expression (28) is integrated into calculation if u(n) of Expression (29), and Xh(n+0.5+Td/T) of Expression (29) are integrated into calculation of u(n+0.5) of Expression (29). As the number of expressions decrease, the calculation time naturally decreases, and response becomes faster.

When L2 in Expression (30) is "0", this indicates the single rate state estimation expression described in Expression (24) and Expression (25), and when L2 is not "0", this indicates a multi-rate state estimation expression.

Figure 10:
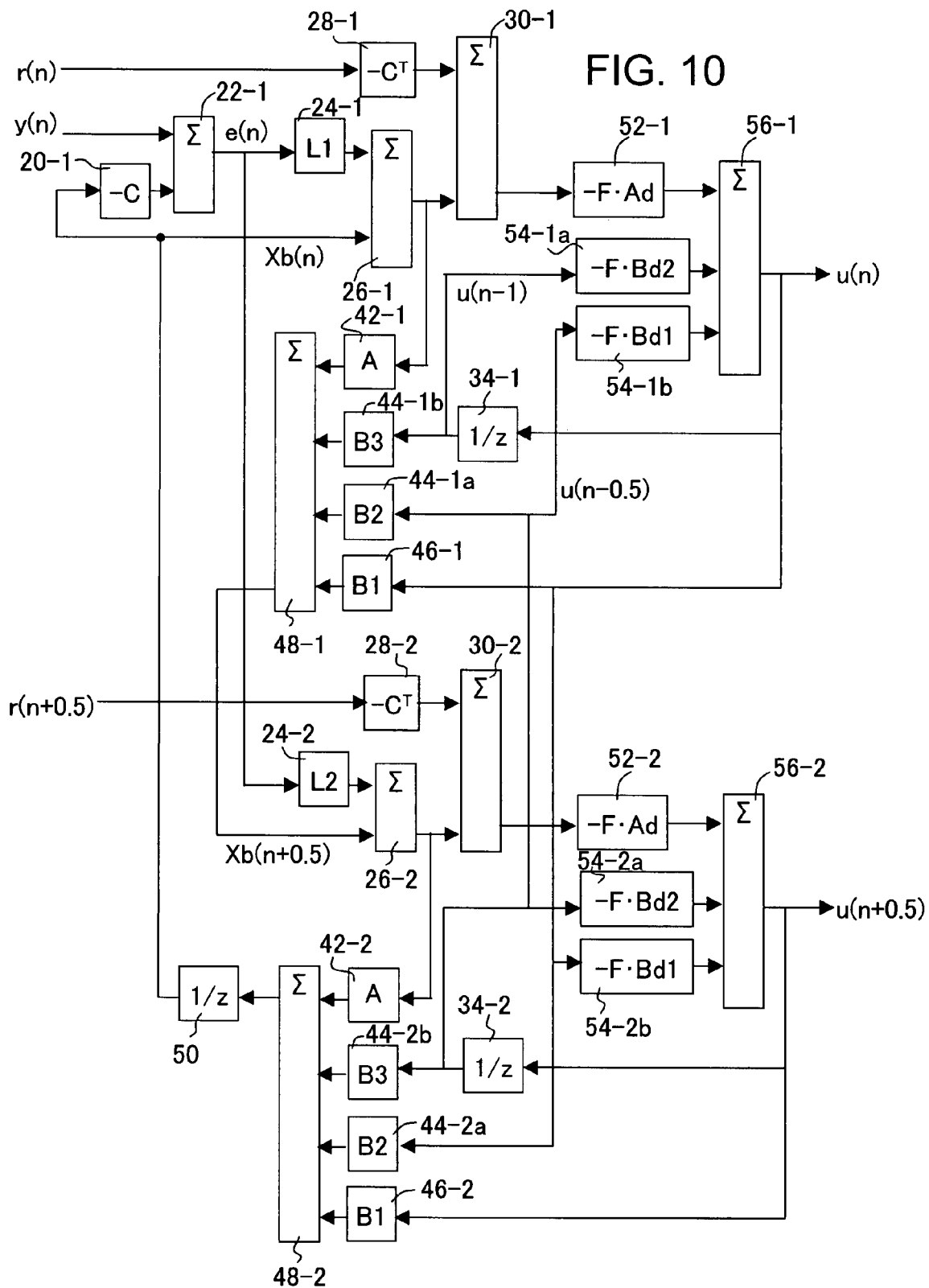
FIG. 10 is a block diagram depicting the current observer in FIG. 8.

FIG. 10 is a block diagram blocking Expression (30). The configuration in FIG. 10 is basically two configurations in FIG. 6 connected in series. As FIG. 10 shows, the observation position (position error) y(n) in current sample n is loaded, and the difference between the predicted position C·Xb(n) in the current sample estimated in the previous sample and the observation position y(n) is computed in the computing block 22-1, so as to generate the estimated position error er[n]. In the multiplication block 24-1, this estimated position error er[n] is multiplied by the estimated gain L1 to generate the correction value.

In the addition block 26-1, this correction value and the estimated state Xb[n], such as a predicted position and predicted velocity, in the current sample, are added. By this, the estimated state Xh(n), such as the estimated position and estimated velocity, in the current sample in Expression (30) is generated.

And in the two degree of freedom control, the difference value between the estimated state (position) Xh(n) and the target position trajectory r(n) is computed in the addition block 30-1, and the result is multiplied by the coefficient matrix −F·Ad in the multiplication block 52-1. On the other hand, the output u(n−1) is multiplied by the coefficient matrix −F·Bd2 in the multiplication block 54-1a, and the output u(n−0.5) is multiplied by the coefficient matrix −F·Bd1 in the multiplication block 54-1b. The outputs of the three multiplication blocks 52-1, 54-1a and 54-1b are added in the addition block 56-1, and the output value u(n) of the third expression in Expression (30) is acquired.

On the other hand, the next estimated state Xb(n+0.5) in (n+0.5) is calculated as the fourth expression of Expression (30) by adding a value when the estimated state Xh(n) in the current sample is multiplied by the coefficient matrix A in the multiplication block 42-1, a value when the output value u(n) is multiplied by the coefficient matrix B1 in the multiplication block 46-1, a value when the output value u(n−0.5) is multiplied by the coefficient matrix B2 in the multiplication block 44-1a, and a value when the output value u(n−1) in the previous sample delayed in the delay block 34-1 is multiplied by the coefficient matrix B3 in the multiplication block 44-1b, in the addition block 48-1.

Then the estimated position error er[n] computed in the computation block 22-1 is multiplied by the estimated gain L2 in the multiplication block 24-2, so as to generate a correction value. And in the addition block 26-1, this correction value and the estimated state Xb[n+0.5], such as a predicted position and predicted velocity, in the current sample, are added. By this, the estimated state Xh(n+0.5), such as an estimated position and estimated velocity, in the current sample of Expression (30), are generated.

And in multi-rate control, the difference value between the estimated state (position) Xh(n+0.5) and the target position trajectory r(n+0.5) is computed in the addition block 30-2, and the result is multiplied by the coefficient matrix −F·Ad in the multiplication block 52-2.

On the other hand, the output u(n−0.5) is multiplied by the coefficient matrix −F·Bd2 in the multiplication block 54-2a, and the output u(n) is multiplied by the coefficient matrix −F·Bd1 in the multiplication block 54-2b. The outputs of the three multiplication blocks 52-2, 54-2a and 54-2b are added in the addition block 56-6, and the output value u(n+0.5) of the sixth expression of Expression (30) is acquired.

On the other hand, the next estimated state Xb(n+1) in (n+1) is calculated as the seventh expression of Expression (30), by adding a value when the estimated state Xh(n+0.5) in the current sample is multiplied by the coefficient matrix A in the multiplication block 42-2, a value when the output value u(n+0.5) is multiplied by the coefficient matrix B1 in the multiplication block 46-2, a value when the output value u(n) is multiplied by the coefficient matrix B2 in the multiplication block 44-2a, and a value when the output value u(n−0.5) in the previous sample delayed in the delay block 34-2 is multiplied by the coefficient matrix B3 in the multiplication block 44-2b, in the addition block 48-2.

In the delay block 50, the estimated state Xb(n+1) in the next sample (n+1) is delayed, and in the multiplication block 20-1, the output of the delay block 50 is multiplied by C so as to calculate the estimated position x(n) in the current sample.

In this way, in the two degree of freedom control system for preventing overrun, the delay of output of the two degree of freedom control output (computing delay and hardware delay of drive amplifier, D/A converter, etc.) is considered, and the estimated state of Td which is advanced by the amount of delay from the sample point of time is computed, then output is computed based on this estimated state, so even if state changes during calculation from the sample point of time, the influence of the output delay can be prevented, and highly accurate position control can be performed, therefore overrun can be prevented.

Also the two degree of freedom control terms are calculated at a same sample time, so the calculation sequence becoming complicated can be prevented in this multi-rate control, and calculation can be performed at high-speed. Also the state estimation sequence can be adhered to, and stability of the entire system can be maintained.

In the blocks in FIG. 30, if L2 in the multiplication block 24-2 is set to "0", it becomes the configuration of single rate state estimation, so the configuration of FIG. 30 can be used for both single rate and multi-rate state estimation.

Third Embodiment of Two Degree of Freedom Control System

Now an embodiment when the disturbance model is separated is shown. An example when the actuator model and disturbance model are separated in the current observer will be described. By implementing a configuration where the disturbance model is separated, a disturbance model having an arbitrary disturbance suppression characteristic can be added easily, without influencing the model of the actuator.

Therefore a current observer where a disturbance model is added can be easily constructed, and also a disturbance model having a desired disturbance characteristic can be added easily to a conventional current observer.

A calculation expression where the disturbance model is separated is created by transforming the multi-rate state estimation expressions of Expression (28) and Expression (29). In Expression (28), the states Xh(n) and Xh(n+Td/T) of Expression (28) are separated into the states Xh(n) and Xh(n+Td/T) of the actuator models of position and velocity, and states Dh(n) and Dh(n+Td/T) of the disturbance model. By this, the following Expression (31) is acquired.

$$\left.\begin{array}{l} e(n) = y(n) - C \cdot Xb(n) \\ Xh(n) = Xb(n) + L1 \cdot e(n) \\ Dh(n) = Db(n) + Ld1 \cdot e(n) \\ Xh(n + Td/T) = Ad \cdot (Xh(n) - C^T \cdot r(n)) + \\ \qquad Bd1 \cdot u(n - 0.5) + Bd2 \cdot u(n - 1) \\ Dh(n + Td/T) = Ad2 \cdot Dh(n) \\ u(n) = -F \cdot Xh(n + Td/T) \\ uout(n) = u(n) - Fd \cdot Dh(n + Td/T) \\ Xb(n + 0.5) = A \cdot Xh(n) + B1 \cdot u(n) + \\ \qquad B2 \cdot u(n - 0.5) + B3 \cdot u(n - 1) \\ Db(n + 0.5) = A2 \cdot Dh(n) \end{array}\right\} \quad (31)$$

As Expression (31) shows, the estimated state Xh(n) of velocity and position is calculated in the same way as Expression (28). Here L1 is an estimated gain of position and velocity. Also the estimated state Dh(n) of the separated disturbance (including bias) is calculated in the same way. Here Ld1 is an estimated gain of bias and disturbance. In the same way, the state advanced by Td is also calculated separately for Xh(n+Td/T) of position and velocity and Dh(n+Td/T) of disturbance.

Accordingly, the output value is calculated separately for the velocity Xh(n+Td/T) and disturbance Dh(n+Td/T), and the difference thereof becomes the output value uout(n). And the next state in (n+0.5) is also calculated separately for Xb(n+0.5) of position and velocity and Db(n+0.5) of disturbance.

In the same way, the states Xh(n+0.5) and Xh(n+0.5+Td/T) in Expression (29) are separated into the states Xh(n+0.5) and Xh(n+0.5+Td/T) of the actuator model of position and velocity, and states Dh(n+0.5) and Dh(n+0.5+Td/T) of the disturbance model. By this, the following Expression (32) is acquired.

$$\left.\begin{array}{l} Xh(n + 0.5) = Xb(n + 0.5) + L2 \cdot e(n) \\ Dh(n + 0.5) = Db(n + 0.5) + Ld2 \cdot e(n) \\ Xh(n + 0.5 + Td/T) = Ad \cdot (Xh(n + 0.5) - \\ \qquad C^T \cdot r(n + 0.5)) + Bd1 \cdot u(n) + Bd2 \cdot u(n - 0.5) \\ Dh(n + 0.5) + Td/T) = Ad2 \cdot Dh(n + 0.5) \\ u(n + 0.5) = -F \cdot Xh(n + 0.5 + Td/T) \\ uout(n + 0.5) = u(n + 0.5) - Fd \cdot Dh(n + 0.5 + Td/T) \\ Xb(n + 1) = A \cdot Xh(n) + B1 \cdot u(n + 0.5) + \\ \qquad B2 \cdot u(n) + B3 \cdot u(n - 0.5) \\ Db(n + 1) = A2 \cdot Dh(n + 0.5) \end{array}\right\} \quad (32)$$

As Expression (32) shows, the estimated state Xh(n+0.5) of velocity and position is calculated in the same way as Expression (28). Here L2 is an estimated gain of position and velocity. Also the estimated state Dh(n+0.5) of the separated disturbance (including bias) is calculated in the same way.

Here Ld2 is an estimated gain of bias and disturbance.

In the same way, the state advanced by Td is also calculated separately for Xh(n+0.5+Td/T) of position and velocity and Dh(n+0.5+Td/T) of disturbance. Accordingly, the output value is calculated separately for the velocity Xh(n+0.5+Td/T) and disturbance Dh(n+0.5+Td/T), and the difference thereof becomes the output value uout(n). And in the next state in (n+1) is also calculated separately for Xb(n+1) of position and velocity and Db(n+1) of disturbance.

In this way, the disturbance model can be separated and calculated. If L2 is "0", Expression (32) becomes a single rate state estimation expression. Expression (31) and Expression (32) have redundancy. In order to decrease the calculation time and prevent a decrease of phase margin, a simplification of the expressions will be described.

In Expression (31), Xh(n+Td/T) of position and velocity for output delay is substituted for the expression of u(n), and Dh(n+Td/T) of disturbance is substituted for the expression of uout(n), then the following Expression (33) is acquired.

$$\left.\begin{aligned}
e(n) &= y(n) - C \cdot Xb(n) \\
Xh(n) &= Xb(n) + L1 \cdot e(n) \\
Dh(n) &= Db(n) + Ld1 \cdot e(n) \\
u(n) &= -F \cdot Ad \cdot (Xh(n) - C^T \cdot r(n)) - \\
      & \quad F \cdot Bd1 \cdot u(n-0.5) - F \cdot Bd2 \cdot u(n-1) \\
uout(n) &= u(n) - Fd \cdot Ad2 \cdot Dh(n) \\
Xb(n+0.5) &= A \cdot Xh(n) + B1 \cdot u(n) + \\
          & \quad B2 \cdot u(n-0.5) + B3 \cdot u(n-1) \\
Db(n+0.5) &= A2 \cdot Dh(n)
\end{aligned}\right\} \quad (33)$$

In the same way, in Expression (32), Xh(n+0.5+Td/T) of position and velocity for output delay is substituted for the expression of u(n+0.5), and Dh(n+0.5+Td/T) of disturbance is substituted for the expression of uout(n+0.5), then the following Expression (34) is acquired.

$$\left.\begin{aligned}
Xh(n+0.5) &= Xb(n+0.5) + L2 \cdot e(n) \\
Dh(n+0.5) &= Db(n+0.5) + Ld2 \cdot e(n) \\
u(n+0.5) &= -F \cdot Ad \cdot (Xh(n+0.5) - C^T \cdot r(n+0.5)) - \\
         & \quad F \cdot Bd1 \cdot u(n) - F \cdot Bd2 \cdot u(n-0.5) \\
uout(n+0.5) &= u(n+0.5) - Fd \cdot Ad2 \cdot Dh(n+0.5) \\
Xb(n+1) &= A \cdot Xh(n+0.5) + B1 \cdot u(n+0.5) + \\
        & \quad B2 \cdot u(n) + B3 \cdot u(n-0.5) \\
Db(n+1) &= A2 \cdot Dh(n+0.5)
\end{aligned}\right\} \quad (34)$$

In this way, the number of calculation expressions is decreased, and calculation time can be decreased.

Then the expressions are integrated. In other words, in Expression (33) and Expression (34), the state estimation calculation is substituted for other expressions, then the following Expression (35) is acquired.

$$\left.\begin{aligned}
e(n) &= y(n) - C \cdot Xb(n) \\
u(n) &= -F \cdot Ad \cdot (Xb(n) + L1 \cdot e(n) - C^T \cdot r(n)) - \\
     & \quad F \cdot Bd1 \cdot u(n-0.5) - F \cdot Bd2 \cdot u(n-1) \\
uout(n) &= u(n) - Fd \cdot Ad2 \cdot (Db(n) + Ld1 \cdot e(n)) \\
Xb(n+0.5) &= A \cdot (Xb(n) + L1 \cdot e(n)) + B1 \cdot u(n) + \\
          & \quad B2 \cdot u(n-0.5) + B3 \cdot u(n-1) \\
Db(n+0.5) &= A2 \cdot (Db(n) + Ld1 \cdot e(n)) \\
u(n+0.5) &= -F \cdot Ad \cdot (Xb(n+0.5) + L2 \cdot e(n) - \\
         & \quad C^T \cdot r(n+0.5)) - F \cdot Bd1 \cdot u(n) - F \cdot Bd2 \cdot u(n-0.5) \\
uout(n+0.5) &= u(n+0.5) - \\
            & \quad Fd \cdot Ad2 \cdot (Db(n+0.5) + Ld2 \cdot e(n)) \\
Xb(n+1) &= A \cdot (Xb(n+0.5) + L2 \cdot e(n)) + \\
        & \quad B1 \cdot u(n+0.5) + B2 \cdot u(n) + B3 \cdot u(n-0.5) \\
Db(n+1) &= A2 \cdot (Db(n+0.5) + Ld2 \cdot e(n))
\end{aligned}\right\} \quad (35)$$

In other words, in Expression (35), Xh(n) in Expression (33) is substituted for u(n) and Xb(n+0.5), Dh(n) is substituted for uout(n) and Db(n+0.5), Xh(n+0.5) in Expression (34) is substituted for u(n+0.5) and Xb(n+1), and Dh(n+0.5) is substituted for uout(n+0.5) and Db(n+1), and the results are integrated.

Expression (35) or Expression (33) and Expression (34) in this form are convenient for double or triple multi-rate control. In other words, when the expressions of which output is up to u(n)–Db(n+0.5) are compared with expressions of which output is up to u(n+0.5)–Db(n+1), the matrix which each state variable is multiplied by at the right hand side becomes the same (only if L1=L2). Therefore the memory for holding matrices can be decreased accordingly.

Figure 11:
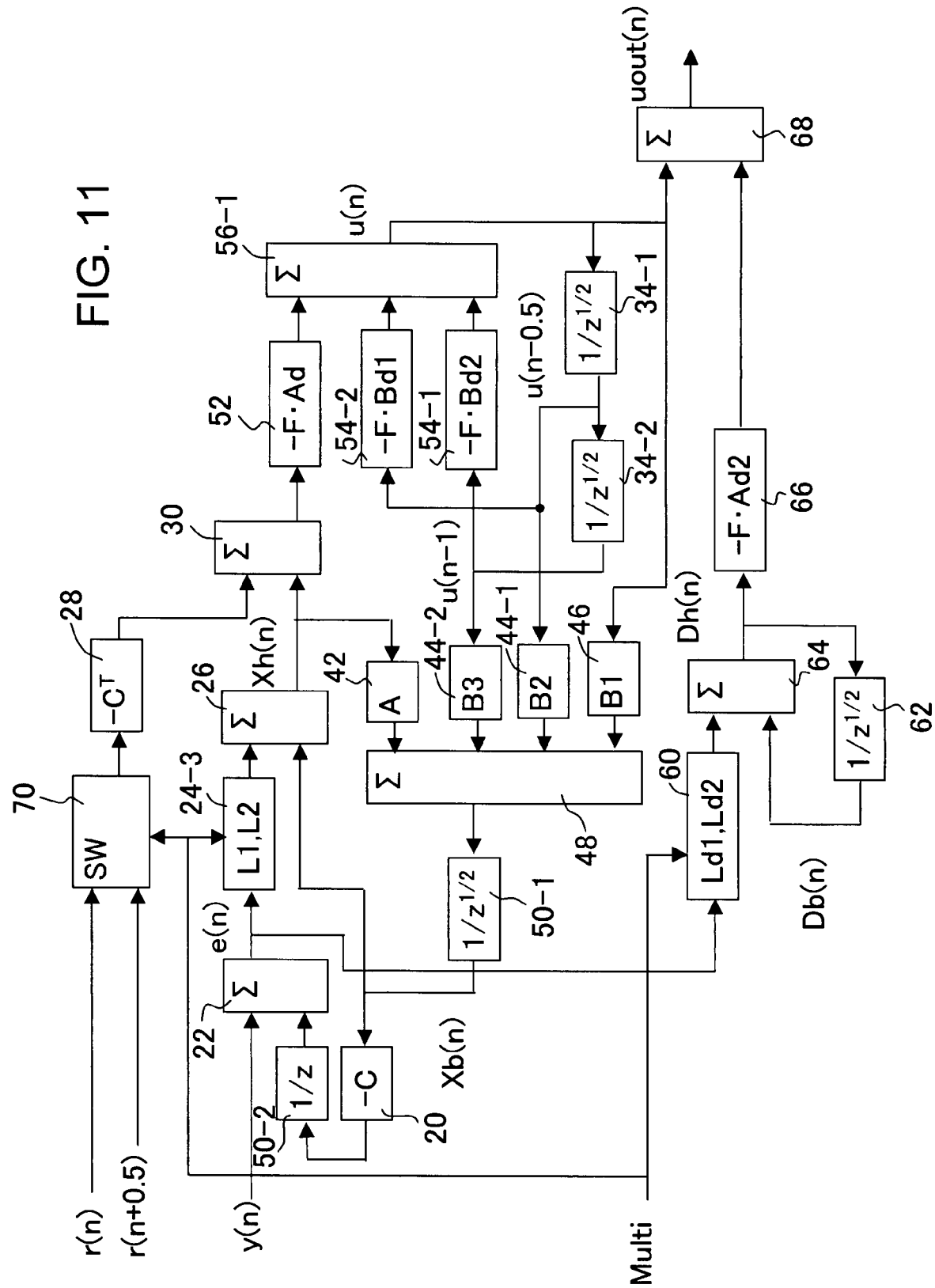
FIG. 11 is a block diagram depicting the current observer according to the third embodiment of the present invention.
Figure 12:
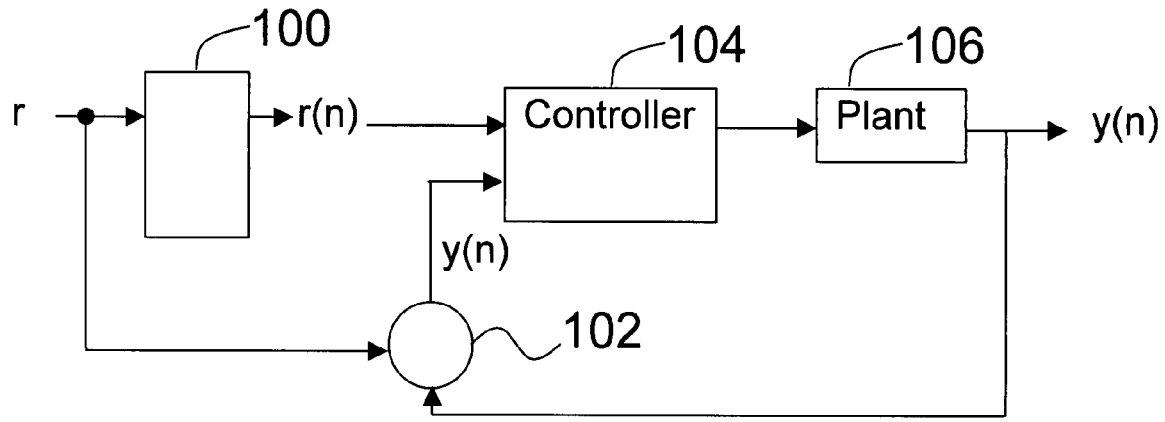
FIG. 12 is a block diagram depicting the current observer of a prior art.
Figure 13:
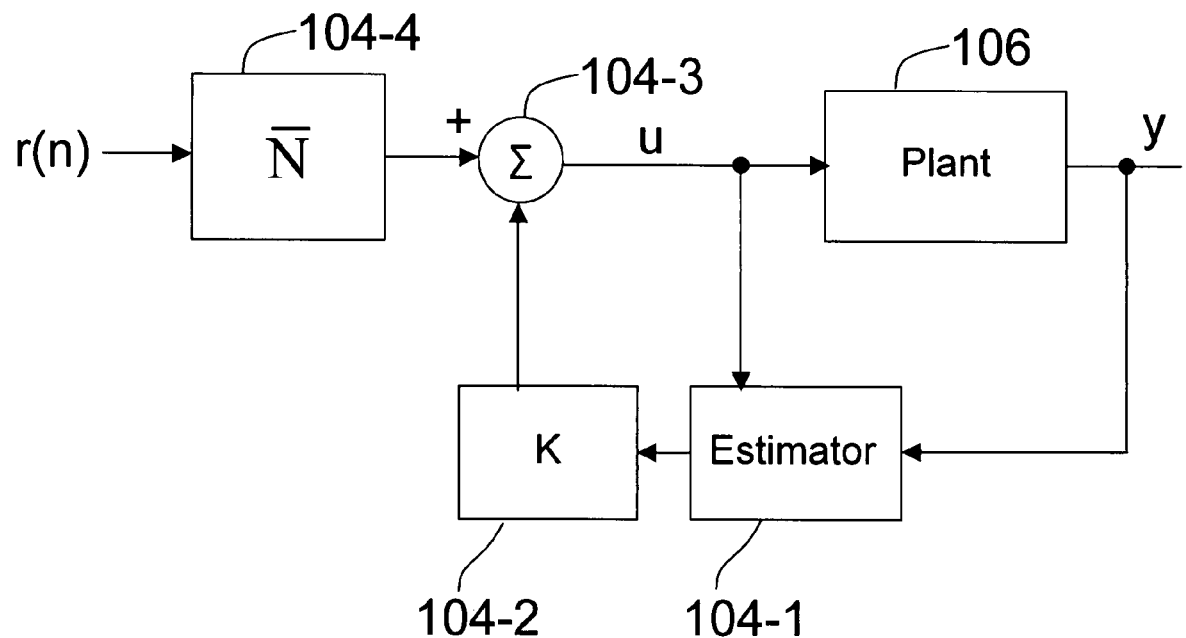
FIG. 13 is a block diagram depicting the two degree of freedom control of a prior art.
Figure 14:
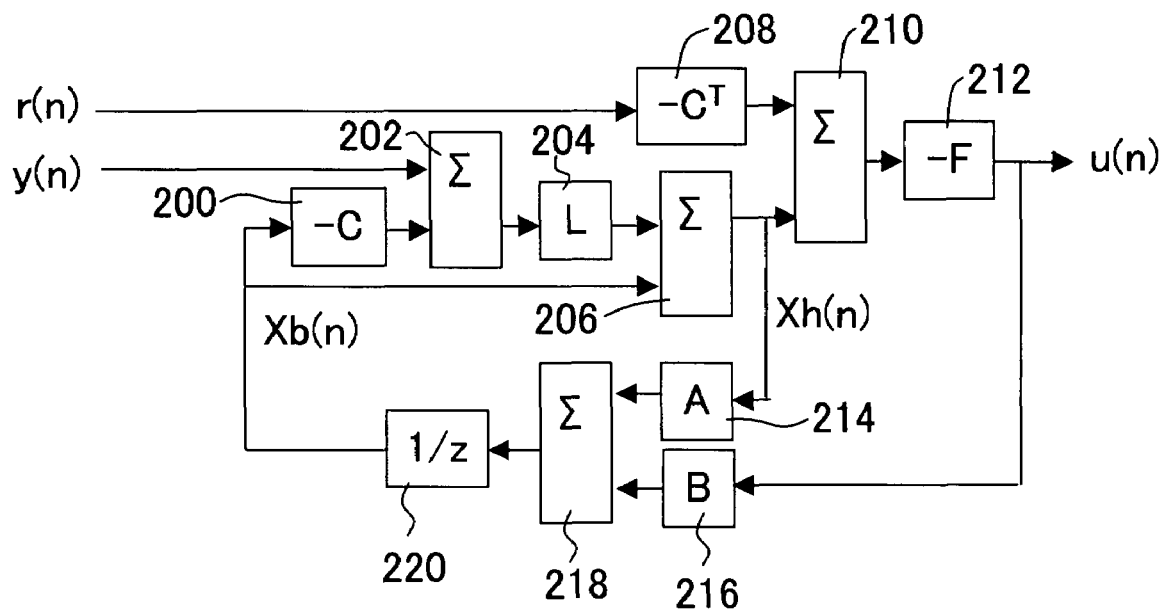
FIG. 14 is a block diagram depicting details of FIG. 13.
Figure 15:
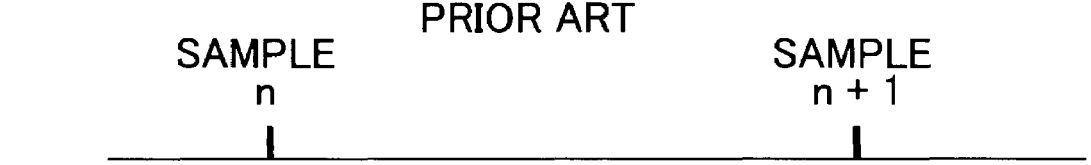
FIG. 15 is a diagram depicting the operation sequence in FIG. 13.
Figure 15:
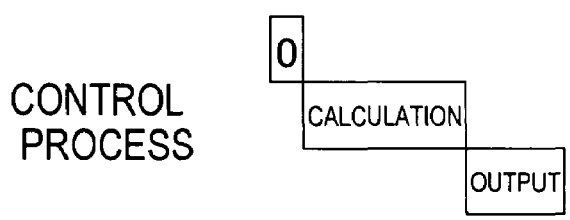
Figure 15:
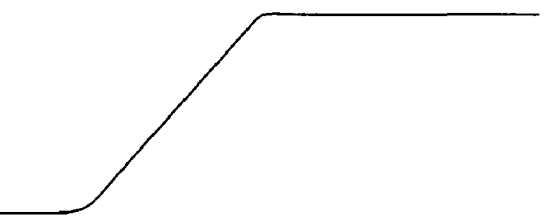

FIG. 11 is a block diagram when Expression (35) is blocked. In the configuration in FIG. 11, the configuration in FIG. 6 is used twice, to which a block for disturbance is added. As FIG. 11 shows, the switch 70 and coefficient multiplication blocks 24-3 and 60 are switched by the multi-rate switching signal Multi.

The observation position (position error) y(n) in the current sample n is loaded, and the difference between the predicted position C·Xb(n) in the current sample estimated in the previous sample and the observation position y(n) is computed in the computation block 22, so as to generate the estimated position error er[n]. In the multiplication block 24-3, this estimated position error er[n] is multiplied by the estimated gain L1 or L2 to generate the correction value.

In the addition block 26, this correction value and the estimated state Xb[n], such as a predicted position and predicted velocity, in the current sample, are added. By this, the estimated state Xh(n), such as the estimated position and estimated velocity, in the current sample in Expression (35), is generated.

And in the two degree of freedom control, the difference between the estimated state (position) Xh(n) and the target position trajectory r(n) is computed in the addition block 30, and the result is multiplied by the coefficient matrix −F·Ad in the multiplication block 52. On the other hand, the output u(n−1) is multiplied by the coefficient matrix −F·Bd2 in the multiplication block 54-1, and the output u(n−0.5) is multiplied by the coefficient matrix −F·Bd1 in the multiplication block 54-2. The outputs of the three multiplication blocks 52, 54-1 and 54-2 are added in the addition block 56-1, and the output value u(n) of the second expression in Expression (35) is acquired.

On the other hand, the next estimated state Xb(n+0.5) in (n+0.5) is calculated as the fourth expression of Expression (35), by adding a value when the estimated state Xh(n) in the current sample is multiplied by the coefficient matrix A in the multiplication block 42, a value when the output value u(n) is multiplied by the coefficient matrix B1 in the multiplication block 46, a value when the output value u(n−0.5) is multiplied by the coefficient matrix B2 in the multiplication block 44-1, and a value when the output value u(n−1) in the previous sample delayed in the delay blocks 34-1 and 34-2 is multiplied by the coefficient matrix B3 in the multiplication block 44-2, in the addition block 48.

Then the estimated position error er[n] is multiplied by the estimated disturbance gain Ld1 or Ld2 in the multiplication block 60, so as to generate a correction value. And in the addition block 64, this correction value and the estimated disturbance state Db[n] in the current sample are added. By this, the estimated disturbance state Dh(n) in the current sample of Expression (35) is generated. And in the multiplication block 66, Dh(n) is multiplied by the coefficient matrix −F·Ad2, and in the addition block, this multiplied value is subtracted from u(n), so as to acquire uout(n).

Then in the second computation, the switch 70 and the coefficient multiplication blocks 24-3 and 60 are switched by the multi-rate control signal, and the same operation is performed.

In this way, the controller model and disturbance model can be separately designed by separating the estimated gain L into the controller model and the disturbance model, and separating the feedback gain F into the controller model and disturbance model.

Also the expressions can be integrated. In Expression (35), nine expressions are sequentially calculated, but what are essential are uout(n), uout(n+0.5), Xb(n+1) and Db(n+1). The other state variables are required only for determining these state variables. So the nine expressions are substituted and integrated into the following Expression (36) for calculating uout(n), uout(n+0.5), Xb(n+1) and Db(n+1).

$$\left.\begin{array}{l}u(n) = -Fx1 \cdot Xb(n) - Fy1 \cdot y(n) - Fr11 \cdot r(n) - \\ \quad Fu11 \cdot u(n-0.5) - Fu12 \cdot u(n-1) \\ uout(n) = u(n) - Fd1 \cdot Db(n) \\ u(n+0.5) = -Fx2 \cdot Xb(n) - Fy2 \cdot y(n) - Fr21 \cdot r(n) - \\ \quad Fr22 \cdot r(n+0.5) - Fu21 \cdot u(n-0.5) - Fu22 \cdot u(n-1) \\ uout(n+0.5) = u(n+0.5) - Fd2 \cdot Db(n) \\ Xb(n+1) = Ax1 \cdot Xb(n) + Ax2 \cdot y(n) + B1 \cdot u(n+0.5) + \\ \quad B2 \cdot u(n) + B3 \cdot u(n-0.5) \\ Db(n+1) = Ad1 \cdot Db(n) + Ad2 \cdot y(n)\end{array}\right\} \quad (36)$$

In Expression (36), e(n) in Expression (35) is substituted for u(n), uout(n), Xb(n+0.5), Db(n+0.5), u(n+0.5), uout(n+0.5), Xb(n+1) and Db(n+1), and Xb(n+0.5) and Db(n+0.5) are substituted for u(n+0.5), uout(n+0.5), Xb(n+1) and Db(n+1), so as to be six expressions, and the coefficients are integrated.

In this way, the calculation expressions can be integrated when necessary.

Other Embodiments

In the above embodiments, the observer control was described using an example of a head positioning device of a magnetic disk device, but the present invention can be applied to other disk devices, such as an optical disk device. The disturbance model was considered, but the present invention can also be applied to cases when the disturbance model is not considered.

The present invention was described using the above embodiments, but the present invention can be modified in various ways within the scope of the essential character thereof, and these variant forms shall not be excluded from the scope of the present invention.

In the two degree of freedom control system for preventing overrun, the delay of output of the two degree of freedom control (computing delay and hardware delay of drive amplifier, D/A converter, etc.) is considered, and the estimated state of Td which is advanced by the amount of delay from the sample point of time is computed, then the output is computed based on this estimated state, so even if state changes during calculation from the sample point of time, the influence of the output delay can be prevented, and highly accurate position control can be performed, therefore overrun can be prevented.

Also since the two degree of freedom control terms are calculated at a same sample time, the calculation sequence becoming complicated can be prevented, and the calculation can be performed at high-speed. Also the state estimation sequence can be adhered to, so stability of the entire system can be maintained. Also the current waveform becomes smooth, which contributes to decreasing the seek time of the medium storage device and the prevention of overrun.

What is claimed is:

1. A position control method for controlling a position of an object to a target position by an actuator, comprising:
    a step of computing a position error based on a target position of the object and a current position of the object;
    a step of correcting an estimated position in a current sample by an estimated position error between said position error and an estimated position in a current sample of a current observer;
    a step of computing a difference between the corrected estimated position and a target trajectory in the current sample;
    a step of computing an estimated position advanced by a predetermined time from the sample point of time based on an output value in one sample before and the difference;
    a step of computing an output value to the actuator based on the advanced estimated position; and
    a step of computing an estimated position for the next output value computation based on the corrected estimated position, the output value in the current sample, and the output value in one sample before.

2. The position control method according to claim 1, further comprising:
    a step of computing a difference between an estimated position for computing the next output value and a target trajectory at the time of (current sample+0.5 sample);
    a step of computing an estimated position which is advanced by a 0.5 sample from the sample point of time based on the output value in a 0.5 sample before, the output value in the current sample and said difference;

a step of computing an output value to the actuator based on the advanced estimated position; and a step of computing an estimated position of the next sample based on the corrected estimated position, the output value of the current sample, the output value in a 0.5 sample before, and the calculated output value.

3. The position control method according to claim 2, wherein the step of computing the advanced estimated position further comprises a step of correcting an estimated position for computing a next output value using the estimated position error.

4. The position control method according to claim 1, further comprising a step of generating a target trajectory at each sample point of time based on the target position.

5. The position control method according to claim 2, further comprising a step of generating a target trajectory between each sample point of time and a point of time advanced by a 0.5 sample from said sample point of time based on the target position.

6. The position control method according to claim 1, wherein the step of computing the position error further comprises a step of computing a position error between a current position acquired from an output of a head which at least reads data of a storage medium and a target position for driving the actuator and moving the head to a predetermined position of the storage medium.

7. A medium storage device, comprising:
a head for at least reading data on a storage medium;
an actuator for positioning the head to a predetermined position of the storage medium; and
a control unit for computing a position error from a target position of the head and a current position acquired from the head, and computing an output value for driving the actuator by a current observer control,
wherein the control unit corrects an estimated position in a current sample by an estimated position error between said position error and an estimated position in a current sample of the current observer, computes a difference between the corrected estimated position and a target trajectory in the current sample, computes an estimated position advanced by a predetermined time from the sample point of time based on an output value in one sample before and the difference, computes the output value to the actuator from the advanced estimated position, and computes an estimated position for the next output value computation based on the corrected estimated position, the output value in the current sample, and the output value in one sample before.

8. The medium storage device according to claim 7, wherein the control unit computes a difference between an estimated position for computing the next output value and a target trajectory at the time of (current sample+0.5 sample), computes an estimated position which is advanced by a 0.5 sample from the sample point of time based on the output value in 0.5 sample before, the output value in the current sample and this difference, computes an output value to the actuator from the advanced estimated position, and computes an estimated position in the next sample based on the corrected estimated position, the output value of the current sample, the output value in a 0.5 sample before, and the calculated output value.

9. The medium storage device according to claim 8, wherein the control unit corrects an estimated position for computing a next output value using the estimated position error in order to compute the advanced estimated position.

10. The medium storage device according to claim 7, wherein the control unit generates a target trajectory at each sample point of time from the target position.

11. The medium storage device according to claim 8, wherein the control unit generates a target trajectory between each sample point of time and a point of time advanced by a 0.5 sample from this sample point of time based on the target position.

12. The medium storage device according to claim 8, further comprising a spindle motor for rotating a storage disk, which is the storage medium.

13. A position control device for controlling a position of an object to a target position by an actuator, comprising:
a block for computing a position error based on a target position of the object and a current position of the object; and
a current observer for correcting an estimated position in a current sample by an estimated position error between the position error and an estimated position in a current sample, computing a difference between the corrected estimated position and a target trajectory in the current sample, computing an estimated position advanced by a predetermined time from the sample point of time based on an output value in one sample before and the difference, computing an output value to the actuator based on the advanced estimated position, and computing an estimated position for the next output value computation based on the corrected estimated position, the output value in the current sample, and the output value in one sample before.

14. The position control device according to claim 13, wherein said current observer computes a difference between an estimated position for computing the next output value and a target trajectory at the time of (current sample+0.5 sample), computes an estimated position which is advanced by a 0.5 sample from the sample point of time based on the output value in a 0.5 sample before, the output value of the current sample and the difference, computes an output value to the actuator based on the advanced estimated position, and computes an estimated position in the next sample based on the corrected estimated position, the output value in the current sample, the output value in a 0.5 sample before, and the calculated output value.

15. The position control device according to claim 14, wherein the current observer corrects an estimated position for computing the next output value using the estimated position error in order to compute the advanced estimated position.

16. The position control device according to claim 13, further comprising a target trajectory generation block for generating a target trajectory at each sample point of time from the target position.

17. The position control device according to claim 14, further comprising a target trajectory generation block for generating a target trajectory between each sample point of time and a point of time advanced by a 0.5 sample from this sample point of time based on the target position.

18. The position control device according to claim 13, wherein the block for computing the position error further comprises a block for computing a position error based on a current position acquired from the output of a head which at least reads data of a storage medium, and a target position for moving the head to a predetermined position on the storage medium by driving the actuator.

* * * * *